United States Patent
Fang et al.

(10) Patent No.: US 10,003,268 B2
(45) Date of Patent: Jun. 19, 2018

(54) SYSTEMS AND METHODS FOR OUTPUT CURRENT REGULATION IN POWER CONVERSION SYSTEMS

(71) Applicant: ON-BRIGHT ELECTRONICS (SHANGHAI) CO., LTD., Shanghai (CN)

(72) Inventors: Qian Fang, Shanghai (CN); Xiangkun Zhai, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days. days.

(21) Appl. No.: 14/753,079

(22) Filed: Jun. 29, 2015

(65) Prior Publication Data

US 2016/0336864 A1    Nov. 17, 2016

(30) Foreign Application Priority Data

May 15, 2015 (CN) .......................... 2015 1 0249026

(51) Int. Cl.
    *H02M 3/335*    (2006.01)
    *H02M 1/12*     (2006.01)
    *H02M 1/42*     (2007.01)

(52) U.S. Cl.
    CPC ......... *H02M 3/33515* (2013.01); *H02M 1/12* (2013.01); *H02M 1/4258* (2013.01);
    (Continued)

(58) Field of Classification Search
    CPC ..................... H02M 3/33515; H02M 3/33507
    (Continued)

(56) References Cited

U.S. PATENT DOCUMENTS 3,913,002 A    10/1975 Steigerwald et al.
3,967,173 A     6/1976 Stich
                (Continued)

FOREIGN PATENT DOCUMENTS

CN    2552047 Y    5/2003
CN    1430314 A    7/2003
                (Continued)

OTHER PUBLICATIONS

Chinese Patent Office, Office Action mailed Aug. 1, 2014, in Application No. 201310015152.4.
(Continued)

*Primary Examiner* — Adolf Berhane
*Assistant Examiner* — Nusrat Quddus
(74) *Attorney, Agent, or Firm* — Jones Day

(57) ABSTRACT

Systems and methods are provided for regulating power conversion systems. A system controller includes: a first controller terminal configured to receive a first signal related to an input signal for a primary winding of a power conversation system; and a second controller terminal configured to output a drive signal to a switch to affect a current flowing through the primary winding, the drive signal being associated with a switching period including an on-time period and an off-time period. The switch is closed (e.g., being turned on) in response to the drive signal during the on-time period. The switch is opened (e.g., being turned off) in response to the drive signal during the off-time period. A duty cycle is equal to a duration of the on-time period divided by a duration of the switching period. The system controller is configured to keep a multiplication product of the duty cycle and the duration of the on-time period approximately constant.

37 Claims, 12 Drawing Sheets

(52) U.S. Cl.
CPC ......... *H02M 3/33507* (2013.01); *Y02B 20/42* (2013.01); *Y02B 70/126* (2013.01)

(58) Field of Classification Search
USPC ............... 363/21.12–21.18, 52, 53, 125–127
See application file for complete search history.

(56) References Cited

U.S. PATENT DOCUMENTS

| | | | |
|---|---|---|---|
| 4,356,542 A | 10/1982 | Bruckner et al. | |
| 4,952,853 A | 8/1990 | Archer | |
| 4,975,820 A | 12/1990 | Szepesi | |
| 5,416,689 A | 5/1995 | Silverstein et al. | |
| 5,550,702 A | 8/1996 | Schmidt et al. | |
| 5,574,392 A | 11/1996 | Jordan | |
| 5,578,908 A | 11/1996 | Persson | |
| 5,796,595 A | 8/1998 | Cross | |
| 5,867,379 A | 2/1999 | Maksimovic et al. | |
| 5,917,714 A | 6/1999 | Ogawa | |
| 6,084,783 A | 7/2000 | Rascon Martinez et al. | |
| 6,292,376 B1 | 9/2001 | Kato | |
| 6,469,917 B1 | 10/2002 | Ben-Yaakov | |
| 6,515,876 B2 | 2/2003 | Koike et al. | |
| 6,611,439 B1 | 8/2003 | Yang et al. | |
| 6,714,425 B2 | 3/2004 | Yamada et al. | |
| 6,737,845 B2 | 5/2004 | Hwang | |
| 6,839,247 B1 | 1/2005 | Yang et al. | |
| 6,842,350 B2 | 1/2005 | Yamada et al. | |
| 6,903,536 B2 | 6/2005 | Yang | |
| 6,914,789 B2 | 7/2005 | Kinoshita et al. | |
| 6,947,298 B2 | 9/2005 | Uchida | |
| 6,954,367 B2 | 10/2005 | Yang et al. | |
| 7,027,313 B2 | 4/2006 | Amei | |
| 7,061,225 B2 | 6/2006 | Yang et al. | |
| 7,099,164 B2 | 8/2006 | Zhu et al. | |
| 7,149,098 B1 | 12/2006 | Chen | |
| 7,342,383 B1 | 3/2008 | Song et al. | |
| 7,362,592 B2 | 4/2008 | Yang et al. | |
| 7,362,593 B2 | 4/2008 | Yang et al. | |
| 7,391,630 B2 | 6/2008 | Acatrinei | |
| 7,394,634 B2 | 7/2008 | Fang et al. | |
| 7,679,938 B2 | 3/2010 | Ye et al. | |
| 7,684,220 B2 | 3/2010 | Fang et al. | |
| 7,719,249 B2 | 5/2010 | Matyas et al. | |
| 7,738,227 B2 | 6/2010 | Fang et al. | |
| 7,746,615 B2 | 6/2010 | Zhu et al. | |
| 7,759,891 B2 | 7/2010 | Serizawa et al. | |
| 7,778,049 B2 | 8/2010 | Morota | |
| 7,791,903 B2 | 9/2010 | Zhang et al. | |
| 8,004,112 B2 | 8/2011 | Koga et al. | |
| 8,018,745 B2 | 9/2011 | Fang et al. | |
| 8,098,502 B2 | 1/2012 | Mao et al. | |
| 8,102,676 B2 | 1/2012 | Huynh et al. | |
| 8,416,596 B2 | 4/2013 | Huang | |
| 8,482,946 B2 | 7/2013 | Fang et al. | |
| 8,488,342 B2 | 7/2013 | Zhang et al. | |
| 8,508,142 B2 | 8/2013 | Lin et al. | |
| 8,519,691 B2 | 8/2013 | McCloy-Stevens | |
| 8,559,152 B2 | 10/2013 | Cao et al. | |
| 8,680,884 B2 | 3/2014 | Chobot | |
| 8,824,167 B2 | 9/2014 | Hughes et al. | |
| 8,824,173 B2 | 9/2014 | Fang et al. | |
| 8,917,527 B2 | 12/2014 | Fang et al. | |
| 9,088,218 B2 | 7/2015 | Zhang et al. | |
| 9,362,737 B2 | 6/2016 | Yang et al. | |
| 9,401,648 B2 | 7/2016 | Li | |
| 9,553,501 B2 | 1/2017 | Yao et al. | |
| 9,564,811 B2 | 2/2017 | Zhai et al. | |
| 9,570,986 B2 | 2/2017 | Zhai et al. | |
| 9,577,536 B2 | 2/2017 | Yang et al. | |
| 9,584,005 B2 | 2/2017 | Fang | |
| 9,647,448 B2 | 5/2017 | Fang et al. | |
| 2002/0131279 A1 | 9/2002 | Tang | |
| 2003/0099119 A1 | 5/2003 | Yamada et al. | |
| 2003/0156433 A1 | 8/2003 | Gong et al. | |
| 2003/0174520 A1 | 9/2003 | Bimbaud | |
| 2004/0201369 A1 | 10/2004 | Perrier et al. | |
| 2004/0218405 A1 | 11/2004 | Yamada et al. | |
| 2005/0036342 A1 | 2/2005 | Uchida | |
| 2005/0099164 A1 | 5/2005 | Yang | |
| 2006/0055433 A1 | 3/2006 | Yang et al. | |
| 2006/0291258 A1 | 12/2006 | Zhu et al. | |
| 2008/0198638 A1 | 8/2008 | Reinberger et al. | |
| 2008/0257397 A1 | 10/2008 | Glaser et al. | |
| 2008/0298099 A1 | 12/2008 | Huang et al. | |
| 2008/0309380 A1 | 12/2008 | Yang et al. | |
| 2008/0316781 A1 | 12/2008 | Liu | |
| 2009/0021233 A1 | 1/2009 | Hsu | |
| 2009/0128113 A1 | 5/2009 | Ryoo | |
| 2009/0219070 A1 | 9/2009 | Zhang et al. | |
| 2010/0253250 A1 | 10/2010 | Marvelly et al. | |
| 2010/0328831 A1 | 12/2010 | Zhang et al. | |
| 2011/0101953 A1 | 5/2011 | Cheng et al. | |
| 2011/0110126 A1 | 5/2011 | Morrish | |
| 2011/0169418 A1 | 7/2011 | Yang et al. | |
| 2012/0008352 A1 | 1/2012 | Huang et al. | |
| 2012/0075891 A1 | 3/2012 | Zhang et al. | |
| 2012/0119650 A1 | 5/2012 | Lee | |
| 2012/0147630 A1* | 6/2012 | Cao ...................... H02M 1/32 363/21.15 |
| 2012/0194227 A1 | 8/2012 | Lin et al. | |
| 2012/0224397 A1 | 9/2012 | Yeh | |
| 2012/0281438 A1 | 11/2012 | Fang et al. | |
| 2013/0003421 A1 | 1/2013 | Fang | |
| 2013/0100715 A1 | 4/2013 | Lin et al. | |
| 2013/0135775 A1 | 5/2013 | Yao et al. | |
| 2013/0181635 A1 | 7/2013 | Ling | |
| 2013/0258723 A1 | 10/2013 | Fang et al. | |
| 2013/0294121 A1 | 11/2013 | Fang et al. | |
| 2013/0336029 A1 | 12/2013 | Cao et al. | |
| 2014/0016366 A1 | 1/2014 | Su | |
| 2014/0029315 A1 | 1/2014 | Zhang et al. | |
| 2015/0023069 A1 | 1/2015 | Zhu et al. | |
| 2015/0055382 A1 | 2/2015 | Yang et al. | |
| 2015/0115919 A1 | 4/2015 | Yang et al. | |
| 2015/0180328 A1 | 6/2015 | Yao et al. | |
| 2015/0301542 A1 | 10/2015 | Yang et al. | |
| 2015/0303787 A1 | 10/2015 | Zhai et al. | |
| 2015/0303898 A1 | 10/2015 | Zhai et al. | |
| 2015/0340952 A1 | 11/2015 | Manohar et al. | |
| 2015/0340957 A1 | 11/2015 | Fang et al. | |
| 2015/0357912 A1 | 12/2015 | Perreault et al. | |
| 2016/0226239 A1 | 8/2016 | Yang et al. | |
| 2016/0336852 A1 | 11/2016 | Fang et al. | |
| 2016/0336868 A1 | 11/2016 | Fang et al. | |
| 2017/0141688 A1 | 5/2017 | Zhai et al. | |
| 2017/0163026 A1 | 6/2017 | Yang et al. | |
| 2017/0179808 A1 | 6/2017 | Zhai et al. | |
| 2017/0187294 A1 | 6/2017 | Fang et al. | |
| 2017/0194869 A1 | 7/2017 | Yao et al. | |
| 2017/0214327 A1 | 7/2017 | Zhu et al. | |
| 2017/0214328 A1 | 7/2017 | Zhu et al. | |

FOREIGN PATENT DOCUMENTS

| | | |
|---|---|---|
| CN | 2567850 Y | 8/2003 |
| CN | 1448005 A | 10/2003 |
| CN | 1459903 A | 12/2003 |
| CN | 1497827 A | 5/2004 |
| CN | 1815838 A | 8/2006 |
| CN | 1917322 A | 2/2007 |
| CN | 101079576 A | 11/2007 |
| CN | 101295872 A | 10/2008 |
| CN | 101340149 A | 1/2009 |
| CN | 101499713 A | 8/2009 |
| CN | 101552570 | 10/2009 |
| CN | 100559678 C | 11/2009 |
| CN | 101662223 A | 3/2010 |
| CN | 101295872 B | 4/2010 |
| CN | 201477463 U | 5/2010 |
| CN | 101924536 A | 12/2010 |
| CN | 101964647 A | 2/2011 |
| CN | 101997412 A | 3/2011 |
| CN | 102202449 | 9/2011 |
| CN | 202009514 U | 10/2011 |

(56) References Cited

FOREIGN PATENT DOCUMENTS

| | | | |
|---|---|---|---|
| CN | 102364990 | A | 2/2012 |
| CN | 102412727 | A | 4/2012 |
| CN | 102487246 | A | 6/2012 |
| CN | 102545567 | A | 7/2012 |
| CN | 102624237 | A | 8/2012 |
| CN | 102625514 | A | 8/2012 |
| CN | 102638169 | A | 8/2012 |
| CN | 102651613 | A | 8/2012 |
| CN | 102761255 | A | 10/2012 |
| CN | 102790531 | A | 11/2012 |
| CN | 102801300 | A | 11/2012 |
| CN | 103036438 | A | 4/2013 |
| CN | 103078489 | | 5/2013 |
| CN | 103166198 | | 6/2013 |
| CN | 103167665 | A | 6/2013 |
| CN | 103178717 | A | 6/2013 |
| CN | 103401424 | A | 11/2013 |
| CN | 103781256 | | 5/2014 |
| CN | 103781257 | | 5/2014 |
| CN | 103887980 | A | 6/2014 |
| CN | 103916027 | A | 7/2014 |
| CN | 103956905 | A | 7/2014 |
| CN | 203747681 | | 7/2014 |
| CN | 103986336 | A | 8/2014 |
| CN | 104022648 | | 9/2014 |
| CN | 104617792 | A | 5/2015 |
| CN | 104853493 | A | 8/2015 |
| CN | 104967328 | A | 10/2015 |
| EP | 0871328 | B1 | 8/2003 |
| EP | 1317052 | B1 | 10/2006 |
| JP | 2003-333839 | A | 11/2003 |
| JP | 2006-237519 | A | 9/2006 |
| JP | 2006-237619 | A | 9/2006 |
| JP | 4064296 | | 3/2008 |
| JP | 2009-36750 | A | 2/2009 |
| TW | 200929824 | | 7/2009 |
| TW | M400069 | | 3/2011 |
| TW | 201117670 | | 5/2011 |
| TW | 201218860 | | 5/2012 |
| TW | 201225495 | | 6/2012 |
| TW | 201241591 | | 10/2012 |
| TW | 201325304 | | 6/2013 |
| TW | I403875 | | 8/2013 |
| TW | I434500 | | 4/2014 |
| TW | 201429132 | | 7/2014 |
| TW | I458232 | | 10/2014 |
| TW | 201541845 | | 11/2015 |
| WO | WO 2012/147453 | | 11/2012 |

OTHER PUBLICATIONS

Chinese Patent Office, Office Action mailed Jan. 17, 2014, in Application No. 201310306106.X.
Chinese Patent Office, Office Action mailed Jan. 3, 2014, in Application No. 201010587658.9.
Taiwan Intellectual Property Office, Office Action mailed Mar. 13, 2014, in Application No. 100101960.
Taiwan Intellectual Property Office, Office Action mailed May 5, 2015, in Application No. 102131370.
United Stated Patent and Trademark, Office Action mailed Mar. 9, 2015, in U.S. Appl. No. 13/967,276.
United Stated Patent and Trademark, Office Action mailed May 14, 2015, in U.S. Appl. No. 13/900,430.
United Stated Patent and Trademark, Office Action mailed Jun. 17, 2015, in U.S. Appl. No. 13/749,516.
Chinese Patent Office, Office Action mailed Jan. 25, 2016, in Application No. 201410157557.6.
Chinese Patent Office, Office Action mailed Nov. 26, 2015, in Application No. 201410134395.4.
Chinese Patent Office, Office Action mailed Dec. 4, 2015, in Application No. 201410198140.4.
United Stated Patent and Trademark, Notice of Allowance mailed Nov. 13, 2015, in U.S. Appl. No. 13/749,516.
United Stated Patent and Trademark, Notice of Allowance mailed Nov. 6, 2015, in U.S. Appl. No. 13/900,430.
United Stated Patent and Trademark, Notice of Allowance mailed Jan. 20, 2016, in U.S. Appl. No. 14/334,553.
United Stated Patent and Trademark, Office Action mailed Oct. 13, 2015, in U.S. Appl. No. 13/967,276.
United Stated Patent and Trademark, Office Action mailed Oct. 30, 2015, in U.S. Appl. No. 13/969,281.
United Stated Patent and Trademark, Office Action mailed Jan. 5, 2016, in U.S. Appl. No. 14/272,323.
United Stated Patent and Trademark, Notice of Allowance mailed Mar. 16, 2016, in U.S. Appl. No. 13/749,516.
United Stated Patent and Trademark, Notice of Allowance mailed Mar. 21, 2016, in U.S. Appl. No. 13/900,430.
United Stated Patent and Trademark, Notice of Allowance mailed Feb. 23, 2016, in U.S. Appl. No. 14/334,553.
Chinese Patent Office, Office Action mailed Aug. 17, 2016, in Application No. 201510053255.9.
Taiwan Intellectual Property Office, Office Action mailed Jul. 29, 2016, in Application No. 105106390.
Chinese Patent Office, Office Action mailed Nov. 2, 2016, in Application No. 201510249026.4.
United States Patent and Trademark, Notice of Allowance mailed Sep. 14, 2016, in U.S. Appl. No. 13/749,516.
United States Patent and Trademark, Notice of Allowance mailed Sep. 28, 2016, in U.S. Appl. No. 13/900,430.
United States Patent and Trademark, Notice of Allowance mailed Sep. 12, 2016, in U.S. Appl. No. 14/272,323.
United States Patent and Trademark, Notice of Allowance mailed Sep. 29, 2016, in U.S. Appl. No. 14/639,607.
United States Patent and Trademark, Notice of Allowance mailed Sep. 9, 2016, in U.S. Appl. No. 14/334,553.
United States Patent and Trademark, Notice of Allowance mailed Sep. 26, 2016, in U.S. Appl. No. 13/967,276.
United States Patent and Trademark, Notice of Allowance mailed Oct. 12, 2016, in U.S. Appl. No. 14/817,081.
United States Patent and Trademark, Notice of Allowance mailed Nov. 22, 2016, in U.S. Appl. No. 13/969,281.
Taiwan Intellectual Property Office, Office Action mailed May 18, 2016, in Application No. 103121063.
Taiwan Intellectual Property Office, Office Action mailed May 24, 2016, in Application No. 104110694.
Taiwan Intellectual Property Office, Office Action mailed May 23, 2016, in Application No. 104132444.
Taiwan Intellectual Property Office, Approval Report mailed May 26, 2016, in Application No. 104125785.
United Stated Patent and Trademark, Notice of Allowance mailed Jun. 24, 2016, in U.S. Appl. No. 13/749,516.
United Stated Patent and Trademark, Notice of Allowance mailed Jul. 11, 2016, in U.S. Appl. No. 13/900,430.
United Stated Patent and Trademark, Notice of Allowance mailed Jul. 14, 2016, in U.S. Appl. No. 14/272,323.
United Stated Patent and Trademark, Notice of Allowance mailed Jul. 27, 2016, in U.S. Appl. No. 14/639,607.
United Stated Patent and Trademark, Notice of Allowance mailed May 26, 2016, in U.S. Appl. No. 14/334,553.
United Stated Patent and Trademark, Notice of Allowance mailed May 27, 2016, in U.S. Appl. No. 13/967,276.
United Stated Patent and Trademark, Office Action mailed May 24, 2016, in U.S. Appl. No. 13/969,281.
Chinese Patent Office, Office Action dated Apr. 5, 2017, in Application No. 201510413940.8.
Chinese Patent Office, Office Action dated Jun. 21, 2017, in Application No. 201510788449.3.
United States Patent and Trademark, Notice of Allowance dated Jun. 23, 2017, in U.S. Appl. No. 14/974,694.
United States Patent and Trademark, Office Action dated Jun. 27, 2017, in U.S. Appl. No. 15/055,261.
United States Patent and Trademark, Office Action dated Jun. 28, 2017, in U.S. Appl. No. 14/638,191.
United States Patent and Trademark, Office Action dated Jul. 25, 2017, in U.S. Appl. No. 15/362,268.

(56) References Cited

OTHER PUBLICATIONS

United States Patent and Trademark, Office Action dated Aug. 24, 2017, in U.S. Appl. No. 15/371,058.
United States Patent and Trademark, Notice of Allowance dated Sep. 6, 2017, in U.S. Appl. No. 14/974,695.
United States Patent and Trademark, Office Action dated Sep. 19, 2017, in U.S. Appl. No. 15/428,996.
United States Patent and Trademark, Office Action dated Oct. 5, 2017, in U.S. Appl. No. 15/374,896.
United States Patent and Trademark, Office Action dated Oct. 23, 2017, in U.S. Appl. No. 15/400,469.
Chinese Patent Office, Office Action dated Aug. 31, 2017, in Application No. 201510249026.4.

* cited by examiner

SYSTEMS AND METHODS FOR OUTPUT CURRENT REGULATION IN POWER CONVERSION SYSTEMS

1. CROSS-REFERENCES TO RELATED APPLICATIONS

This application claims priority to Chinese Patent Application No. 201510249026.4, filed May 15, 2015, commonly assigned, incorporated by reference herein for all purposes.

2. BACKGROUND OF THE INVENTION

Certain embodiments of the present invention are directed to integrated circuits. More particularly, some embodiments of the invention provide systems and methods for regulating output currents. Merely by way of example, some embodiments of the invention have been applied to power conversion systems. But it would be recognized that the invention has a much broader range of applicability.

Light emitting diodes (LEDs) are widely used for lighting applications. Oftentimes, approximately constant currents are used to control working currents of LEDs to achieve constant brightness. FIG. 1 is a simplified diagram showing a conventional LED lighting system. The LED lighting system 100 includes a system controller 102, resistors 104, 124, 126 and 132, capacitors 106, 120 and 134, a diode 108, a transformer 110 including a primary winding 112, a secondary winding 114 and an auxiliary winding 116, a power switch 128, a current sensing resistor 130, and a rectifying diode 118. The system controller 102 includes terminals (e.g., pins) 138, 140, 142, 144, 146 and 148. For example, the power switch 128 is a bipolar junction transistor. In another example, the power switch 128 is a MOS transistor. In yet another example, the power switch 128 is an insulated-gate bipolar transistor.

An alternate-current (AC) input voltage 152 is applied to the system 100. A bulk voltage 150 (e.g., a rectified voltage no smaller than 0 V) associated with the AC input voltage 152 is received by the resistor 104. The capacitor 106 is charged in response to the bulk voltage 150, and a voltage 154 is provided to the system controller 102 at the terminal 138 (e.g., terminal VCC). If the voltage 154 is larger than a predetermined threshold voltage in magnitude, the system controller 102 begins to operate normally and generates a drive signal 199 through the terminal 142 (e.g., terminal GATE). The switch 128 receives a signal 156 associated with the drive signal 199. For example, the drive signal 199 is a pulse-width-modulation (PWM) signal with a switching frequency and a duty cycle. The switch 128 is closed (e.g., being turned on) or open (e.g., being turned off) in response to the drive signal 199 so that the output current 158 is regulated to be approximately constant.

The auxiliary winding 116 charges the capacitor 106 through the diode 108 when the switch 128 is opened (e.g., being turned off) in response to the drive signal 199 so that the system controller 102 can operate normally. For example, a feedback signal 160 is provided to the system controller 102 through the terminal 140 (e.g., terminal FB) in order to detect the end of a demagnetization process of the secondary winding 114 (e.g., for charging or discharging the capacitor 134 using an internal error amplifier in the system controller 102). In another example, the feedback signal 160 is provided to the system controller 102 through the terminal 140 (e.g., terminal FB) in order to detect the beginning and the end of the demagnetization process of the secondary winding 114. The resistor 130 is used for detecting a primary current 162 flowing through the primary winding 112, and a current-sensing signal 164 is provided to the system controller 102 through the terminal 144 (e.g., terminal CS) to be processed during each switching cycle. Peak magnitudes of the current-sensing signal 164 are sampled and provided to the internal error amplifier. The capacitor 120 is used to maintain an output voltage 168 so as to keep a stable output current through an output load (e.g., one or more LEDs 122). For example, the system 100 implements a primary-side-regulation scheme with single-stage power factor correction (PFC). As an example, the system 100 implements a flyback architecture or a buck-boost architecture.

FIG. 2 is a simplified conventional diagram showing the system controller 102 as part of the system 100. The system controller 102 includes a ramp-signal generator 202, an under-voltage lock-out (UVLO) component 204, a modulation component 206, a logic controller 208, a driving component 210, a demagnetization detector 212, an error amplifier 216, and a current-sensing component 214.

As shown in FIG. 2, the UVLO component 204 detects the signal 154 and outputs a signal 218. If the signal 154 is larger than a first predetermined threshold in magnitude, the system controller 102 begins to operate normally. If the signal 154 is smaller than a second predetermined threshold in magnitude, the system controller 102 is turned off. The second predetermined threshold is smaller than or equal to the first predetermined threshold in magnitude. The error amplifier 216 receives a signal 220 from the current-sensing component 214 and a reference signal 222 and outputs an amplified signal 224 to the modulation component 206. The modulation component 206 also receives a signal 228 from the ramp-signal generator 202 and outputs a modulation signal 226. For example, the signal 228 is a ramping signal and increases, linearly or non-linearly, to a peak magnitude during each switching period. The logic controller 208 processes the modulation signal 226 and outputs a control signal 230 to the driving component 210 which generates the signal 199 to turn on or off the switch 128. For example, the demagnetization detector 212 detects the feedback signal 160 and outputs a signal 232 for determining the end of the demagnetization process of the secondary winding 114. In another example, the demagnetization detector 212 detects the feedback signal 160 and outputs the signal 232 for determining the beginning and the end of the demagnetization process of the secondary winding 114. In addition, the demagnetization detector 212 outputs a trigger signal 298 to the logic controller 208 to start a next cycle. The system controller 102 is configured to keep an on-time period associated with the modulation signal 226 approximately constant for a given output load.

The system controller 102 is operated in a voltage-mode where, for example, the signal 224 from the error amplifier 216 and the signal 228 from the oscillator 202 are both voltage signals and are compared by the comparator 206 to generate the modulation signal 226 to drive the power switch 128. Therefore, an on-time period associated with the power switch 128 is determined by the signal 224 and the signal 228.

FIG. 3 is a simplified conventional diagram showing the current-sensing component 214 and the error amplifier 216 as parts of the system controller 102. The current-sensing component 214 includes a switch 302 and a capacitor 304. The error amplifier 216 includes switches 306 and 308, an operational transconductance amplifier (OTA) 310.

As shown in FIG. 3, the current-sensing component 214 samples the current-sensing signal 164 and the error amplifier 216 amplifies the difference between the signal 220 and the reference signal 222. Specifically, the switch 302 is closed (e.g., being turned on) or open (e.g., being turned off) in response to a signal 314 in order to sample peak magnitudes of the current-sensing signal 164 in different switching periods. If the switch 302 is closed (e.g., being turned on) in response to the signal 314 and the switch 306 is open (e.g., being turned off) in response to the signal 232 from the demagnetization detector 212, the capacitor 304 is charged and the signal 220 increases in magnitude. If the switch 306 is closed (e.g., being turned on) in response to the signal 232, the switch 308 is open (e.g., being turned off) in response to a signal 312 and the difference between the signal 220 and the reference signal 222 is amplified by the amplifier 310. The signal 312 and the signal 232 are complementary to each other. For example, during the demagnetization process of the secondary winding 114, the signal 232 is at a logic high level and the signal 312 is at a logic low level. The switch 306 remains closed (e.g., being turned on) and the switch 308 remains open (e.g., being turned off). The OTA 310, together with the capacitor 134, performs integration associated with the signal 220. In another example, after the completion of the demagnetization process of the secondary winding 114, the signal 232 is at the logic low level and the signal 312 is at the logic high level.

Under stable normal operations, an average output current is determined, according to the following equation (e.g., without taking into account any error current):

$$\bar{I}_o = \frac{1}{2} \times N \times \frac{V_{ref\_ea}}{R_{cs}} \quad \text{(Equation 1)}$$

where N represents a turns ratio between the primary winding 112 and the secondary winding 114, $V_{ref\_ea}$ represents the reference signal 222 and $R_{cs}$ represents the resistance of the resistor 130. As shown in Equation 1, the parameters associated with peripheral components, such as N and $R_{cs}$, can be properly selected through system design to achieve output current regulation.

For LED lighting, efficiency, power factor and total harmonic are also important. For example, efficiency is often needed to be as high as possible (e.g., >90%), and a power factor is often needed to be greater than 0.9. Moreover, total harmonic distortion is often needed to be as low as possible (e.g., <10%) for some applications. But the system 100 often cannot satisfy all these needs.

Hence it is highly desirable to improve the techniques of regulating output currents of power conversion systems.

3. BRIEF SUMMARY OF THE INVENTION

Certain embodiments of the present invention are directed to integrated circuits. More particularly, some embodiments of the invention provide systems and methods for regulating output currents. Merely by way of example, some embodiments of the invention have been applied to power conversion systems. But it would be recognized that the invention has a much broader range of applicability.

According to one embodiment, a system controller for regulating a power conversion system includes: a first controller terminal configured to receive a first signal related to an input signal for a primary winding of a power conversation system; and a second controller terminal configured to output a drive signal to a switch to affect a current flowing through the primary winding of the power conversion system, the drive signal being associated with a switching period including an on-time period and an off-time period. The switch is closed in response to the drive signal during the on-time period. The switch is opened in response to the drive signal during the off-time period. A duty cycle is equal to a duration of the on-time period divided by a duration of the switching period. The system controller is configured to keep a multiplication product of the duty cycle and the duration of the on-time period approximately constant.

According to another embodiment, a system controller for regulating a power conversion system includes: a ramp-current generator configured to receive a modulation signal and generate a ramp current based at least in part on the modulation signal; a ramp-signal generator configured to receive the ramp current and generate a ramping signal based at least in part on the ramp current; a modulation component configured to receive the ramping signal and generate the modulation signal based at least in part on the ramping signal; a driving component configured to receive the modulation signal and output a drive signal to a switch to affect a current flowing through a primary winding of a power conversion system, the drive signal being associated with a switching period including an on-time period and an off-time period. The switch is closed in response to the drive signal during the on-time period. The switch is opened in response to the drive signal during the off-time period. A duty cycle is equal to a duration of the on-time period divided by a duration of the switching period. The ramp-current generator is further configured to generate the ramp current approximately proportional to the duty cycle in magnitude.

According to yet another embodiment, a system controller for regulating a power conversion system includes: a first controller terminal configured to provide a compensation signal based on at least information associated with a current flowing through a primary winding of a power conversion system; a ramp-current generator configured to receive a modulation signal, the compensation signal and a first reference signal and generate a ramp current based at least in part on the modulation signal, the compensation signal and the first reference signal; a ramp-signal generator configured to receive the ramp current and generate a ramping signal based at least in part on the ramp current; a modulation component configured to receive the ramping signal and the compensation signal and generate the modulation signal based at least in part on the ramping signal and the compensation signal; and a driving component configured to receive the modulation signal and output a drive signal to a switch to affect the current, the drive signal being associated with a switching period including an on-time period and an off-time period. The switch is closed in response to the drive signal during the on-time period. The switch is opened in response to the drive signal during the off-time period. A duty cycle is equal to a duration of the on-time period divided by a duration of the switching period. The ramp-current generator is further configured to generate the ramp current approximately proportional in magnitude to a multiplication product of the duty cycle and a difference, the different representing the first reference signal minus the compensation signal in magnitude.

In one embodiment, a method for regulating a power conversion system includes: generating a drive signal associated with a switching period including an on-time period and an off-time period; and outputting the drive signal to a switch to affect a current flowing through a primary winding of a power conversion system. The outputting the drive signal to the switch to affect the current includes: outputting the drive signal to close the switch during the on-time period; and outputting the drive signal to open the switch during the off-time period. A duty cycle is equal to a duration of the on-time period divided by a duration of the switching period. The generating the drive signal associated with the switching period includes keeping a multiplication product of the duty cycle and the duration of the on-time period approximately constant.

In another embodiment, a method for regulating a power conversion system includes: receiving a modulation signal; generating a ramp current based at least in part on the modulation signal; receiving the ramp current; generating a ramping signal based at least in part on the ramp current; receiving the ramping signal; generating the modulation signal based at least in part on the ramping signal; receiving the modulation signal; generating a drive signal based at least in part on the modulation signal, the drive signal being associated with a switching period including an on-time period and an off-time period; and outputting the drive signal to a switch to affect a current flowing through a primary winding of a power conversion system. The outputting the drive signal to the switch to affect the current includes: outputting the drive signal to close the switch during the on-time period; and outputting the drive signal to open the switch during the off-time period. A duty cycle is equal to a duration of the on-time period divided by a duration of the switching period. The generating the ramp current based at least in part on the modulation signal includes generating the ramp current approximately proportional to the duty cycle in magnitude.

In yet another embodiment, a method for regulating a power conversion system includes: providing a compensation signal based on at least information associated with a current flowing through a primary winding of a power conversion system; receiving a modulation signal, the compensation signal and a first reference signal; generating a ramp current based at least in part on the modulation signal, the compensation signal and the first reference signal; receiving the ramp current; generating a ramping signal based at least in part on the ramp current; receiving the ramping signal and the compensation signal; generating the modulation signal based at least in part on the ramping signal and the compensation signal; receiving the modulation signal; and outputting a drive signal to a switch to affect the current, the drive signal being associated with a switching period including an on-time period and an off-time period. The outputting the drive signal to the switch to affect the current includes: outputting the drive signal to close the switch during the on-time period; outputting the drive signal to open the switch during the off-time period. A duty cycle is equal to a duration of the on-time period divided by a duration of the switching period. The generating the ramp current based at least in part on the modulation signal, the compensation signal and the first reference signal includes generating the ramp current approximately proportional in magnitude to a multiplication product of the duty cycle and a difference, the different representing the first reference signal minus the compensation signal in magnitude.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide systems and methods for regulating output currents. Merely by way of example, some embodiments of the invention have been applied to power conversion systems. But it would be recognized that the invention has a much broader range of applicability.

Figure 1:
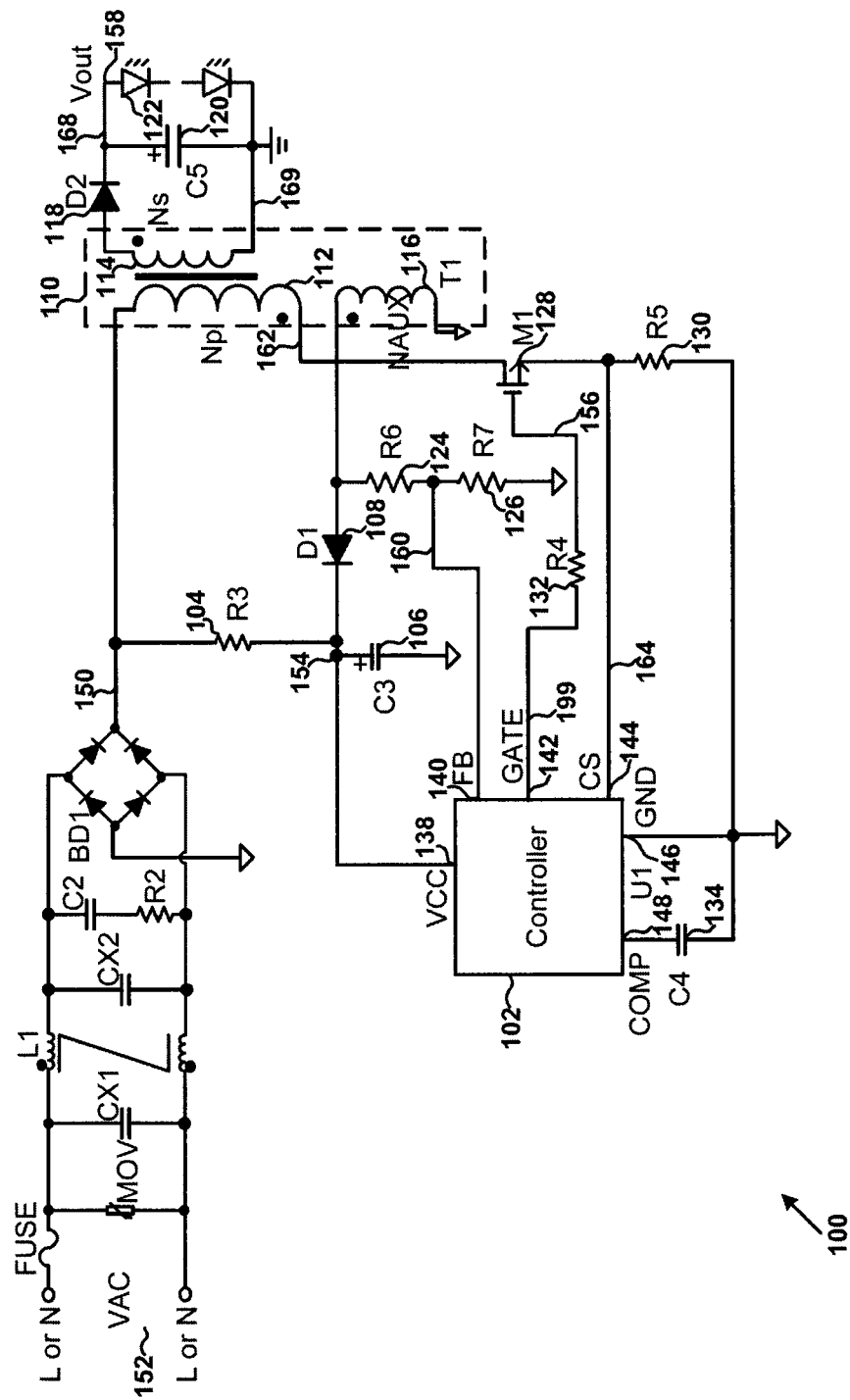
FIG. 1 is a simplified diagram showing a conventional LED lighting system.
Figure 2:
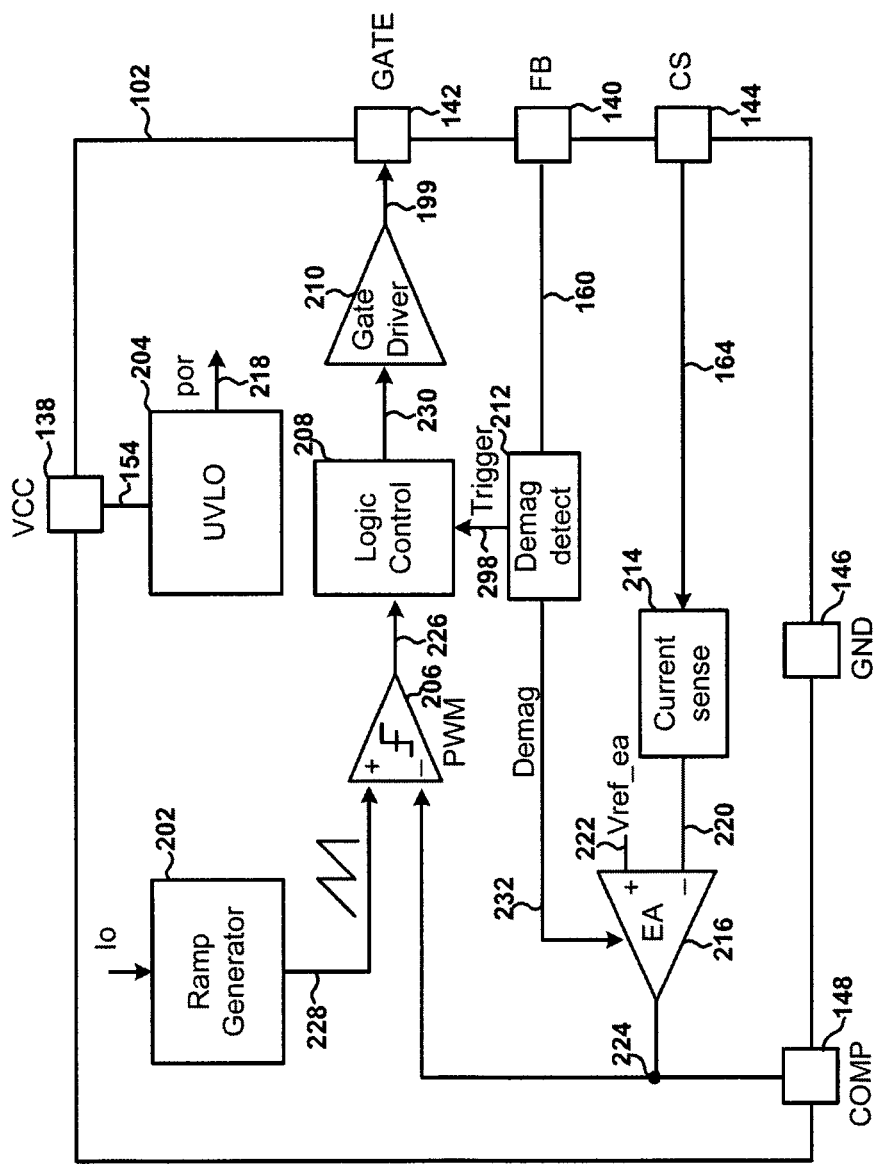
FIG. 2 is a simplified conventional diagram showing a system controller as part of the system as shown in FIG. 1.
Figure 3:
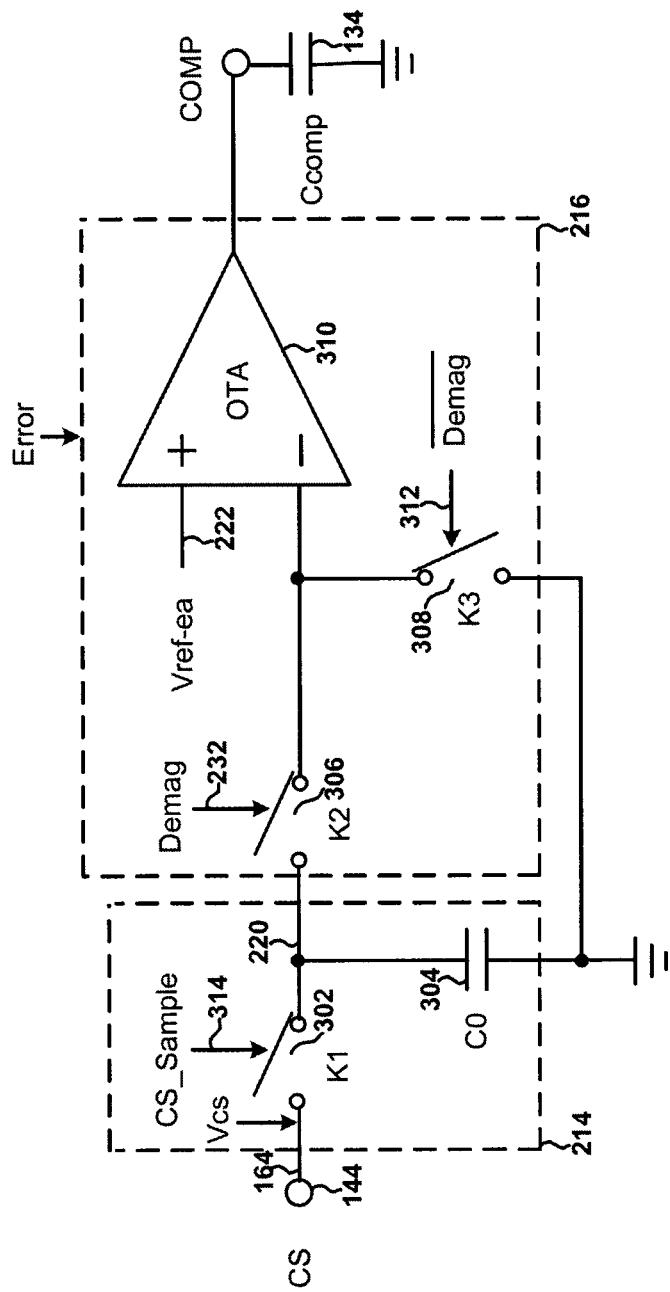
FIG. 3 is a simplified conventional diagram showing a current-sensing component and an error amplifier as parts of the system controller as shown in FIG. 2.

Referring to FIG. 1, to achieve high efficiency (e.g., >90%), the system 100 may operate in a quasi-resonant (QR) mode, as an example. A peak value of the primary current 162 is determined as follows:

$$I_{in\_peak} = \left(\frac{T_{on}}{L_p}\right) \cdot V_{bulk} \quad \text{(Equation 2)}$$

where $I_{in\_peak}$ represents a peak value of the primary current 162, $T_{on}$ represents an on-time period during which the power switch 128 is closed (e.g., being turned on), $V_{bulk}$ represents the bulk voltage 150, and $L_p$ represents the inductance of the primary winding 112.

For example, assuming the on-time period associated with the power switch 128 keeps approximately constant for a given input voltage and a given output load and the inductance of the primary winding 112 keeps approximately constant, the peak value of the primary current 162 follows the bulk voltage 150 (e.g., associated with a rectified sine waveform), according to Equation 2. In another example, an average of the primary current 162 is an average value of the primary current 162 during one or more switching periods, or is an average value of the primary current 162 during one or more switching periods that slide over time. In yet another example, the average of the primary current 162 is determined as follows:

$$I_{in\_ave} = \frac{1}{2} D \cdot I_{in\_peak} = \frac{T_{on}}{2T_s} \cdot I_{in\_peak} = \left(\frac{T_{on}^2}{L_p}\right) \cdot \frac{V_{bulk}}{2(T_{on} + T_{off})} \quad \text{(Equation 3)}$$

where $T_s$ represents a switching period including an on-time period (e.g., $T_{on}$) during which the power switch 128 is closed (e.g., being turned on) and an off-time period (e.g., $T_{off}$) during which the power switch 128 is open (e.g., being turned off). In addition, D represents a duty cycle associated with the power switch 128 and is determined as follows:

$$D = \frac{T_{on}}{T_{on} + T_{off}} \quad \text{(Equation 4)}$$

If the system 100 operates in the QR mode, the off-time period (e.g., $T_{off}$) is the same as a demagnetization period (e.g., $T_{demag}$, associated with a demagnetization process of the secondary winding 114). Assuming the on-time period remains approximately constant in duration, the demagnetization period (e.g., $T_{demag}$) changes with the peak value of the primary current 162 and thus the bulk voltage 150. As such, the switching period (e.g., $T_s$) changes with the bulk voltage 150. If the bulk voltage 150 increases in magnitude, the peak value of the primary current 162 increases and the switch period (e.g., $T_s$) increases in duration. As a result, the average of the primary current 162 does not follow closely the bulk voltage 150 and thus does not have a similar waveform as the bulk voltage 150 (e.g., a rectified sine waveform), which may result in poor total harmonic distortion.

Figure 4:
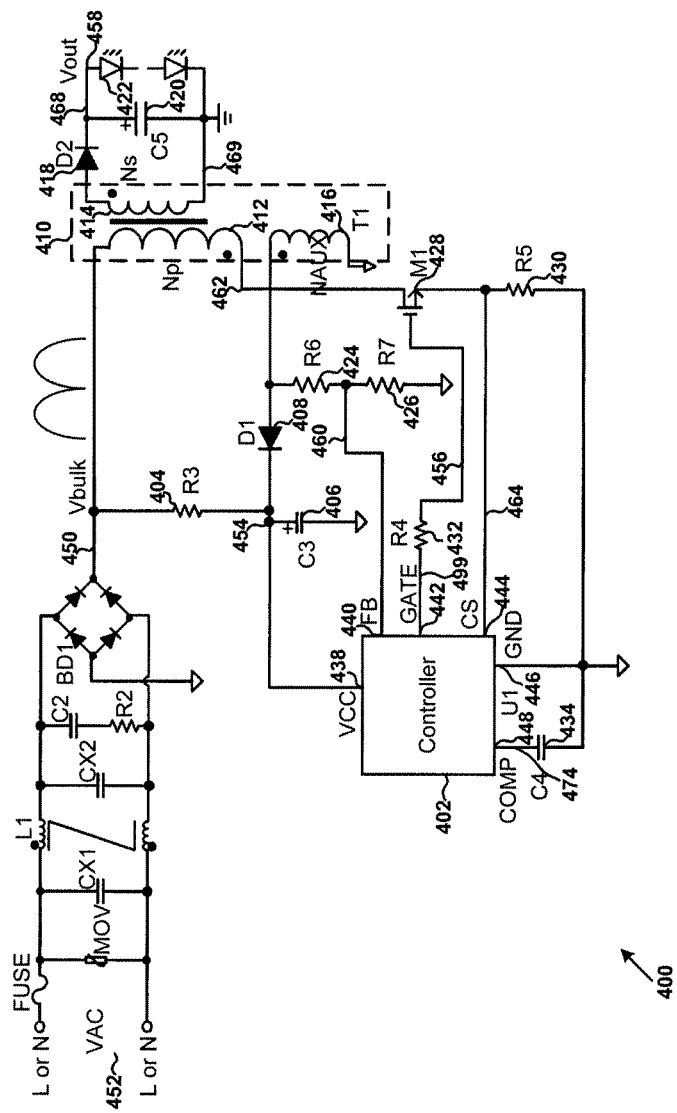
FIG. 4 is a simplified diagram showing a power conversion system according to an embodiment of the present invention.

FIG. 4 is a simplified diagram showing a power conversion system according to an embodiment of the present invention. This diagram is merely an example, which should not unduly limit the scope of the claims. One of ordinary skill in the art would recognize many variations, alternatives, and modifications. The system 400 includes a system controller 402, resistors 404, 424, 426, and 432, capacitors 406, 420, and 434, a diode 408, a transformer 410 including a primary winding 412, a secondary winding 414 and an auxiliary winding 416, a power switch 428, a current sensing resistor 430, and a rectifying diode 418. The system controller 402 includes terminals (e.g., pins) 438, 440, 442, 444, 446, and 448. For example, the power switch 428 includes a bipolar junction transistor. In another example, the power switch 428 includes a MOS transistor. In yet another example, the power switch 428 includes an insulated-gate bipolar transistor (IGBT). The system 400 provides power to an output load 422, e.g., one or more LEDs. In some embodiments, the resistor 432 is removed. For example, the system 400 operates in a quasi-resonant (QR) mode.

According to some embodiments, the system controller 402 is implemented to vary the duration of an on-time period (e.g., $T_{on}$) during which the power switch 428 keeps closed (e.g., being turned on) with a bulk voltage 450 which is associated with an alternate-current (AC) input voltage 452. For example, the bulk voltage 450 (e.g., a rectified voltage no smaller than 0 V) is received by the resistor 404. In another example, the capacitor 406 is charged in response to the bulk voltage 450, and a voltage 454 is provided to the system controller 402 at the terminal 438 (e.g., terminal VCC). In yet another example, if the voltage 454 is larger than a predetermined threshold voltage in magnitude, the system controller 402 begins to operate normally, and outputs a signal 499 through the terminal 442 (e.g., terminal GATE). In yet another example, the switch 428 is closed (e.g., being turned on) or open (e.g., being turned off) in response to a drive signal 456 associated with the signal 499 so that the output current 458 is regulated to be approximately constant.

According to one embodiment, the auxiliary winding 416 charges the capacitor 406 through the diode 408 when the switch 428 is opened (e.g., being turned off) in response to the drive signal 456 so that the system controller 402 can operate normally. For example, a feedback signal 460 is provided to the system controller 402 through the terminal 440 (e.g., terminal FB) in order to detect the end of a demagnetization process of the secondary winding 414 for charging or discharging the capacitor 434 using an internal error amplifier in the system controller 402. In another example, the feedback signal 460 is provided to the system controller 402 through the terminal 440 (e.g., terminal FB) in order to detect the beginning and the end of the demagnetization process of the secondary winding 414. As an example, the capacitor 434 is charged or discharged in response to a compensation signal 474 at the terminal 448 (e.g., terminal COMP). In another example, the resistor 430 is used for detecting a primary current 462 flowing through the primary winding 412, and a current-sensing signal 464 is provided to the system controller 402 through the terminal 444 (e.g., terminal CS) to be processed during each switching cycle (e.g., corresponding to each switching period of the power switch 428). In yet another example, peak magnitudes of the current-sensing signal 464 are sampled and provided to the internal error amplifier. In yet another example, the capacitor 434 is coupled to an output terminal of the internal error amplifier. In yet another example, the capacitor 420 is used to maintain an output voltage 468 so as to keep a stable output current through the output load 422 (e.g., one or more LEDs). For example, the system 400 implements a primary-side-regulation scheme with single-stage power factor correction (PFC). As an example, the system 400 implements a flyback architecture or a buck-boost architecture.

According to another embodiment, an average of the primary current 162 is an average value of the primary current 162 during one or more switching periods, or is an average value of the primary current 162 during one or more switching periods that slide over time. For example, the average of the primary current 162 is determined as follows:

$$I_{in\_ave} = \frac{1}{2} D \cdot I_{in\_peak} = \frac{1}{2} D \cdot \frac{T_{on}}{L_p} \cdot V_{bulk} = \left(\frac{T_{on}^2}{L_p}\right) \cdot \frac{V_{bulk}}{2(T_{on} + T_{off})} \quad \text{(Equation 5)}$$

where $T_s$ represents a switching period including an on-time period (e.g., $T_{on}$) during which the power switch 428 is closed (e.g., being turned on) and an off-time period (e.g., $T_{off}$) during which the power switch 428 is open (e.g., being turned off). In another example, a sum of the duration of the on-time period (e.g., $T_{on}$) and the off-time period (e.g., $T_{off}$) is equal to the duration of the switching period $T_s$. In addition, D represents a duty cycle associated with the power switch 428 and is determined as follows:

$$D = \frac{T_{on}}{T_{on} + T_{off}} \quad \text{(Equation 6)}$$

According to certain embodiments, the system controller 402 is implemented to keep a multiplication product of the duty cycle and the duration of the on-time period constant to achieve low total harmonic distortion as follows:

$$D \times T_{on} = \text{constant} \quad \text{(Equation 7)}$$

For example, according to Equation 7, if the multiplication product of the duty cycle and the duration of the on-time period is kept constant, the average of the primary current 462 changes with the bulk voltage 450 (e.g., associated with a rectified sine waveform).

In some embodiments, the system controller 402 is implemented to keep a multiplication product of the duty cycle and the duration of the on-time period approximately constant to achieve low total harmonic distortion as follows:

$$D \times T_{on} \cong \text{constant} \quad \text{(Equation 8)}$$

For example, according to Equation 8, if the multiplication product of the duty cycle and the duration of the on-time period is kept approximately constant, the average of the primary current 462 changes (e.g., approximately linearly) with the bulk voltage 450 (e.g., associated with a rectified sine waveform). In another example, as shown in Equation 8, the error range of the multiplication product of the duty cycle and the duration of the on-time period being constant is ±5%. In yet another example, as shown in Equation 8, the error range of the multiplication product of the duty cycle and the duration of the on-time period being constant is ±10%. In yet another example, as shown in Equation 8, the error range of the multiplication product of the duty cycle and the duration of the on-time period being constant is ±15%. In yet another example, as shown in Equation 8, the error range of the multiplication product of the duty cycle and the duration of the on-time period being constant is ±20%.

Figure 5A:
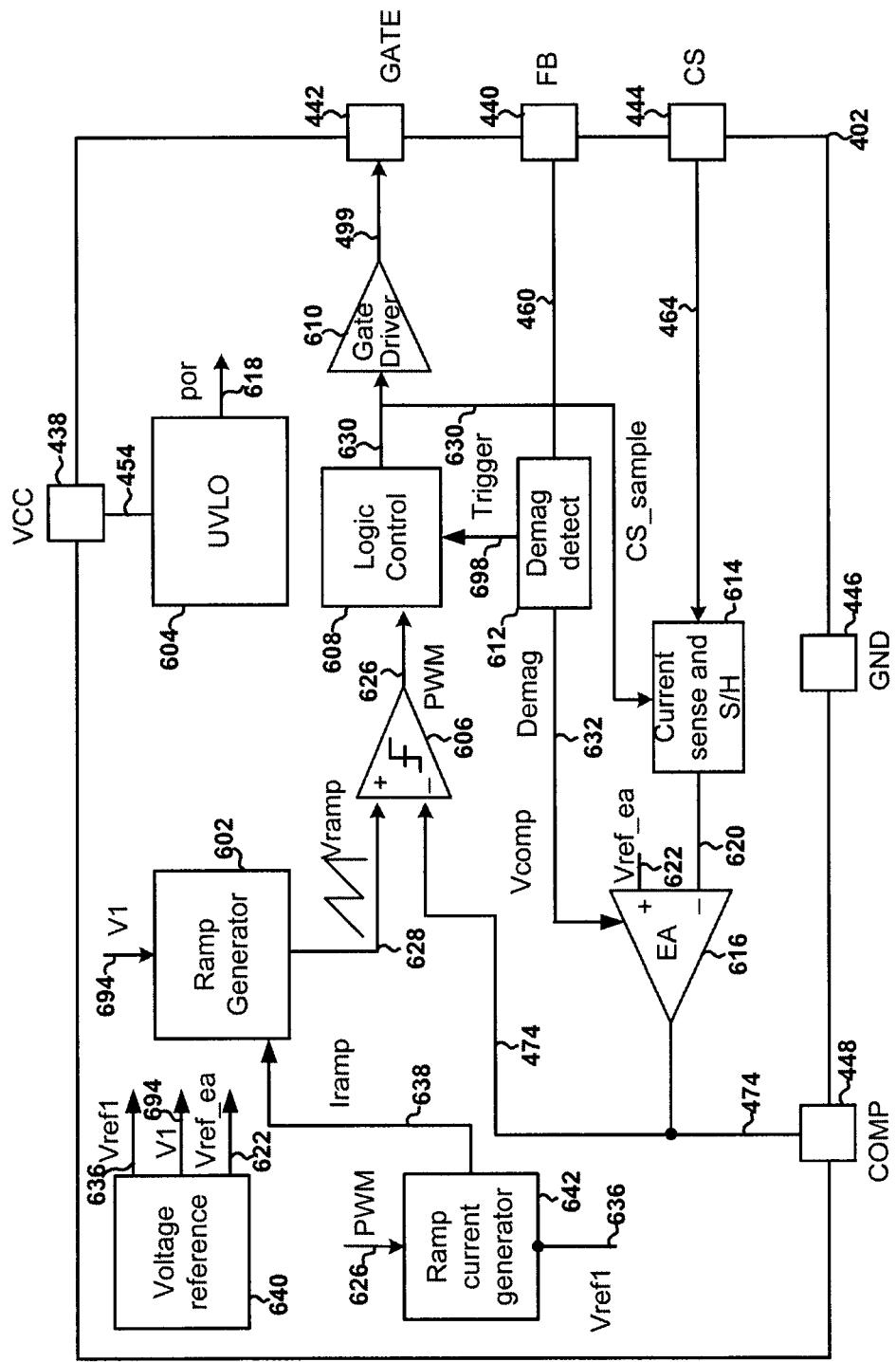
FIG. 5(a) is a simplified diagram showing a system controller as part of the power conversion system as shown in FIG. 4 according to an embodiment of the present invention.

FIG. 5(a) is a simplified diagram showing the system controller 402 as part of the power conversion system 400 according to an embodiment of the present invention. This diagram is merely an example, which should not unduly limit the scope of the claims. One of ordinary skill in the art would recognize many variations, alternatives, and modifications. The system controller 402 includes a ramp-signal generator 602, an under-voltage lock-out (UVLO) component 604, a modulation component 606, a logic controller 608, a driving component 610, a demagnetization detector 612, an error amplifier 616, a current-sensing-and-sample/hold component 614, a reference-voltage generator 640, and a ramp-current generator 642.

According to one embodiment, the UVLO component 604 detects the signal 454 and outputs a signal 618 (e.g., por). For example, if the signal 454 is larger than a first predetermined threshold in magnitude, the system controller 402 begins to operate normally. If the signal 454 is smaller than a second predetermined threshold in magnitude, the system controller 402 is turned off. In another example, the second predetermined threshold is smaller than or equal to the first predetermined threshold in magnitude. In yet another example, the error amplifier 616 receives a signal 620 from the current-sensing-and-sample/hold component 614 and a reference signal 622. In yet another example, the error amplifier 616 generates a current which charges or discharges the capacitor 434 to generate the compensation signal 474 (e.g., $V_{comp}$). In yet another example, the compensation signal 474 (e.g., $V_{comp}$) is provided to the modulation component 606. In yet another example, the capacitor 434 is coupled to the terminal 448 and forms, together with the error amplifier 616, an integrator or a low-pass filter. In yet another example, the error amplifier 616 is a transconductance amplifier and outputs a current which is proportional to a difference between the reference signal 622 and the signal 620. In yet another example, the error amplifier 616 together with the capacitor 434 generates the compensation signal 474 (e.g., $V_{comp}$) which is a voltage signal.

As an example, the reference-voltage generator 640 outputs a reference signal 636 (e.g., $V_{ref1}$) to the ramp-current generator 642, outputs a voltage signal 694 (e.g., V1) to the ramp-signal generator 602, and outputs a reference signal 622 (e.g., $V_{ref\_ea}$) to the error amplifier 616. In another example, the ramp-signal generator 602 also receives a current signal 638 (e.g., $I_{ramp}$) generated by the ramp-current generator 642 and generates a ramping signal 628. In yet another example, the current-sensing-and-sample/hold component 614 samples the current sensing signal 464 in response to the control signal 630 and then holds the sampled signal until the current-sensing-and-sample/hold component 614 samples again the current sensing signal 464.

According to another embodiment, the current 638 (e.g., $I_{ramp}$) flows from the ramp-current generator 642 to the ramp-signal generator 602. For example, the current 638 (e.g., $I_{ramp}$) flows from the ramp-signal generator 602 to the ramp-current generator 642. In another example, the modulation component 606 receives the ramping signal 628 and outputs a modulation signal 626. In yet another example, the logic controller 608 processes the modulation signal 626 and outputs a control signal 630 to the current-sensing-and-sample/hold component 614 and the driving component 610. In yet another example, the modulation signal 626 corresponds to a pulse-width-modulation (PWM) signal. In yet another example, the driving component 610 generates the signal 499 related to the drive signal 456 to affect the switch 428. In yet another example, when the signal 499 is at the logic high level, the signal 456 is at the logic high level, and when the signal 499 is at the logic low level, the signal 456 is at the logic low level.

According to yet another embodiment, the demagnetization detector 612 detects the feedback signal 460 and outputs a demagnetization signal 632 for determining the end of the demagnetization process of the secondary winding 414. For example, the demagnetization detector 612 detects the feedback signal 460 and outputs the demagnetization signal 632 for determining the beginning and the end of the demagnetization process of the secondary winding 414. In another example, the demagnetization detector 612 outputs a trigger signal 698 to the logic controller 608 to start a next cycle (e.g., corresponding to a next switching period).

In one embodiment, the on-time period (e.g., $T_{on}$) is determined as follows:

$$T_{on} = \frac{V_{comp} - V1}{slp} \quad \text{(Equation 9)}$$

where $V_{comp}$ represents the compensation signal 474 (e.g., the output of the error amplifier 616), V1 represents the signal 694, and slp represents a slope of the ramping signal 628. For example, the ramping signal 628 increases, linearly or non-linearly, to a peak magnitude during each switching period, and the signal 694 (e.g., V1) corresponds to a start point of the increase of the ramping signal 628. As an example, the slope of the ramping signal 628 is determined as follows:

$$slp = \frac{I_{ramp}}{C} \quad \text{(Equation 10)}$$

where $I_{ramp}$ represents the current 638, and C represents the capacitance of an internal capacitor in the ramp-signal generator 602. Combining Equations 8-10, it is determined:

$$D \times T_{on} = D \times \frac{(V_{comp} - V1) \times C}{I_{ramp}} = \text{constant} \quad \text{(Equation 11)}$$

To keep the multiplication product of the duty cycle (e.g., D) and the duration of the on-time period (e.g., $T_{on}$) constant, the ramp-current generator 642 generates the current 638 (e.g., $I_{ramp}$) to be proportional in magnitude to the duty cycle (e.g., D), according to some embodiments. For example, the current 638 (e.g., $I_{ramp}$) is determined as follows:

$$I_{ramp} = k_1 * D \quad \text{(Equation 12)}$$

where $k_1$ represents a coefficient parameter (e.g., a constant).

In some embodiments, the ramp-current generator 642 generates the current 638 to be approximately proportional in magnitude to the duty cycle (e.g., D) so that the multiplication product of the duty cycle (e.g., D) and the duration of the on-time period (e.g., $T_{on}$) is kept approximately constant. For example, the current 638 (e.g., $I_{ramp}$) is determined as follows:

$$I_{ramp} \cong k_1 * D \quad \text{(Equation 13)}$$

where $k_1$ represents a coefficient parameter (e.g., a constant). In another example, as shown in Equation 13, the error range of the current 638 being proportional in magnitude to the duty cycle is ±5%. In yet another example, as shown in Equation 13, the error range of the current 638 being proportional in magnitude to the duty cycle is ±10%. In yet another example, as shown in Equation 13, the error range of the current 638 being proportional in magnitude to the duty cycle is ±15%. In yet another example, as shown in Equation 13, the error range of the current 638 being proportional in magnitude to the duty cycle is ±20%.

As discussed above and further emphasized here, FIG. 5(a) is merely an example, which should not unduly limit the scope of the claims. One of ordinary skill in the art would recognize many variations, alternatives, and modifications. For example, instead of receiving the modulation signal 626, the ramp-current generator 642 receives the signal 499 associated with the drive signal 456. In another example, instead of receiving the modulation signal 626, the ramp-current generator 642 receives the demagnetization signal 632. In yet another example, instead of receiving the modulation signal 626, the ramp-current generator 642 receives a signal complementary to the demagnetization signal 632.

Figure 5B:
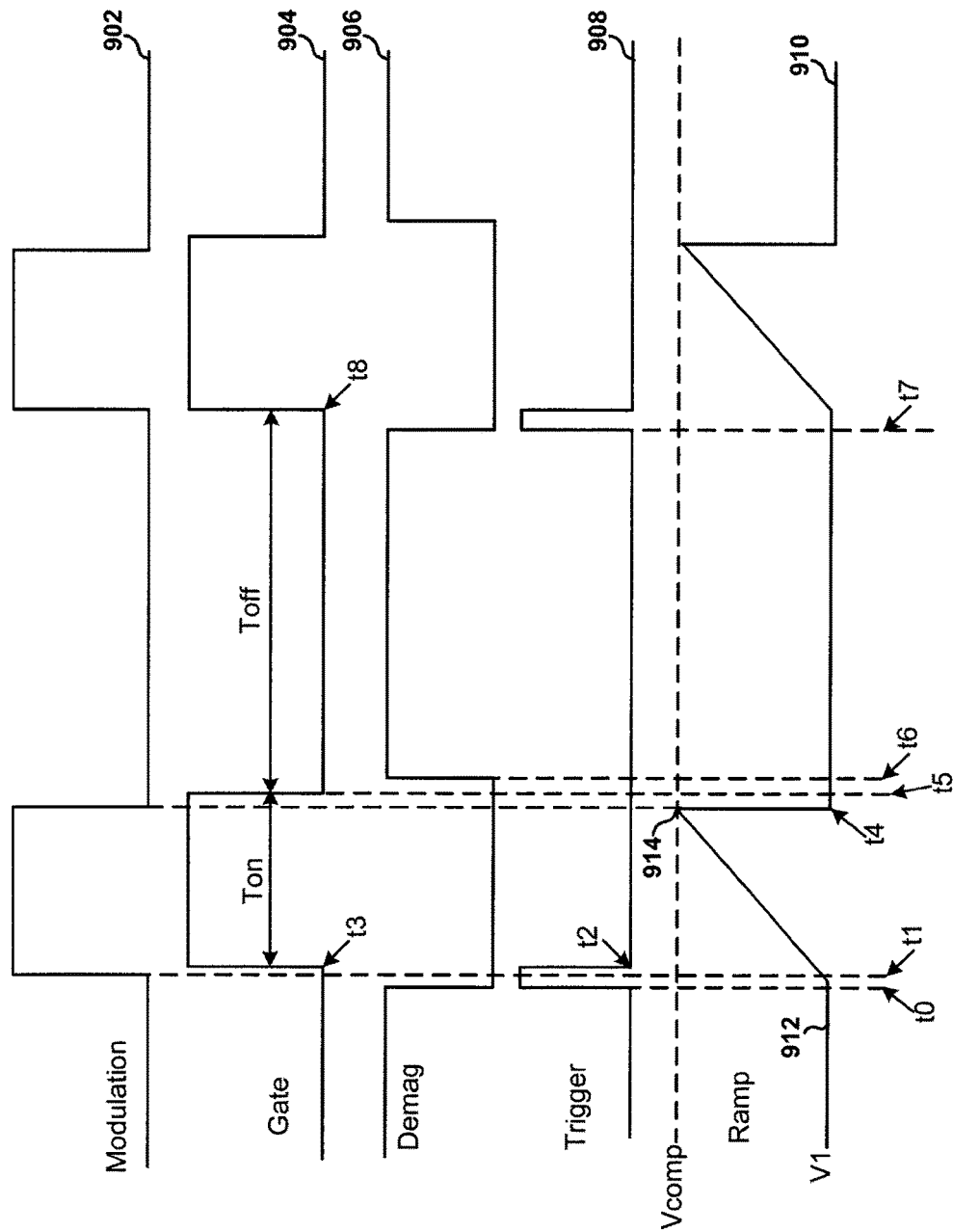
FIG. 5(b) is a simplified timing diagram for a system controller as part of the power conversion system as shown in FIG. 4 according to an embodiment of the present invention.

FIG. 5(b) is a simplified timing diagram for the system controller 402 as part of the power conversion system 400 according to an embodiment of the present invention. This diagram is merely an example, which should not unduly limit the scope of the claims. One of ordinary skill in the art would recognize many variations, alternatives, and modifications. The waveform 902 represents the modulation signal 626 as a function of time, the waveform 904 represents the signal 499 as a function of time, the wave form 906 represents the demagnetization signal 632 as a function of time, the waveform 908 represents the trigger signal 698 as a function of time, and the waveform 910 represents the ramping signal 628 as a function of time.

An on-time period and an off-time period associated with the signal 499 are shown in FIG. 5(b). The on-time period begins at a time $t_3$ and ends at a time $t_5$, and the off-time period begins at the time $t_5$ and ends at a time $t_8$. For example, $t_0 \leq t_1 \leq t_2 \leq t_3 \leq t_4 \leq t_5 \leq t_6 \leq t_7 \leq t_8$.

According to one embodiment, at $t_0$, the demagnetization signal 632 changes from the logic high level to the logic low level. For example, the demagnetization detector 612 generates a pulse (e.g., between $t_0$ and $t_2$) in the trigger signal 698 to trigger a new cycle. As an example, the ramping signal 628 begins to increase from a magnitude 912 to a magnitude 914 (e.g., at $t_4$). In another example, at $t_1$, the signal 626 changes from the logic low level to the logic high level. After a short delay, the signal 499 changes (e.g., at $t_3$) from the logic low level to the logic high level, and in response the switch 428 is closed (e.g., being turned on). In yet another example, at $t_4$, the signal 626 changes from the logic high level to the logic low level, and the ramping signal 628 decreases from the magnitude 914 to the magnitude 912. After a short delay, the signal 499 changes (e.g., at $t_5$) from the logic high level to the logic low level, and in response, the switch 428 is open (e.g., being turned off). As an example, at $t_6$, the demagnetization signal 632 changes from the logic low level to the logic high level which indicates a beginning of a demagnetization process. In another example, at $t_7$, the demagnetization signal 632 changes from the logic high level to the logic low level which indicates the end of the demagnetization process. In yet another example, the demagnetization detector 612 generates another pulse in the trigger signal 698 to start a next cycle. In yet another example, the magnitude 912 of the ramping signal 628 is associated with the signal 694. In yet another example, the magnitude 914 of the ramping signal 628 is associated with the magnitude of the compensation signal 474.

According to another embodiment, the magnitude change of the ramping signal 628 during the on-time period is determined as follows:

$$\Delta V_{ramp} = V_{comp} - V1 = slp \times T_{on} \quad \text{(Equation 14)}$$

where $\Delta V_{ramp}$ represents the magnitude changes of the ramping signal 628, $V_{comp}$ represents the signal 474, V1 represents the signal 694, slp represents a ramping slope associated with the ramping signal 628, and $T_{on}$ represents the duration of the on-time period. For example, V1 corresponds to the magnitude 912 of the ramping signal 628. Based on Equation 14, the duration of the on-time period is determined as follows:

$$T_{on} = \frac{V_{comp} - V1}{slp} \quad \text{(Equation 15)}$$

As shown in Equation 15, for a given compensation signal (e.g., the signal 474), the duration of the on-time period is determined by the ramping slope of the ramping signal 628, according to certain embodiments. For example, a slope of the waveform 910 between $t_1$ and $t_4$ corresponds to the ramping slope of the ramping signal 628.

Figure 5C:
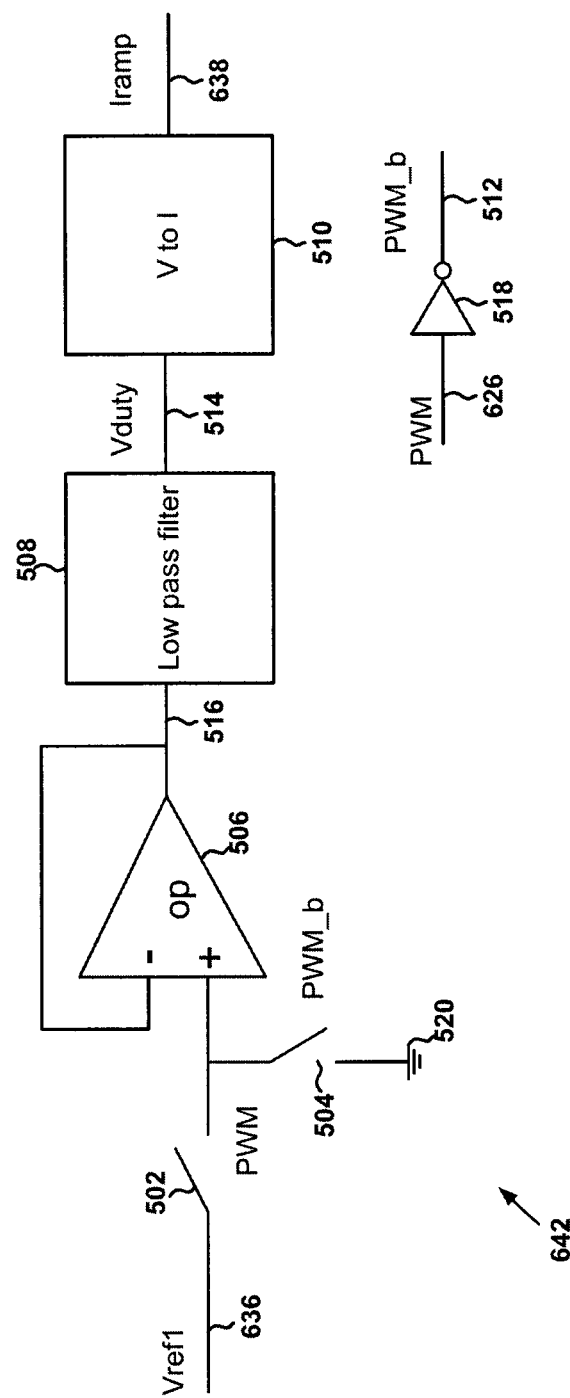
FIG. 5(c) is a simplified diagram showing a ramp-current generator as part of the system controller as shown in FIG. 5(a) according to one embodiment of the present invention.

FIG. 5(c) is a simplified diagram showing the ramp-current generator 642 as part of the system controller 402 according to one embodiment of the present invention. This diagram is merely an example, which should not unduly limit the scope of the claims. One of ordinary skill in the art would recognize many variations, alternatives, and modifications. The ramp-current generator 642 includes an operational amplifier 506, a low pass filter 508, a voltage-to-current converter 510, a NOT gate 518, and switches 502 and 504.

According to one embodiment, the switch 502 is closed or opened in response to the modulation signal 626 (e.g., PWM), and the switch 504 is closed or opened in response to a signal 512 (e.g., PWM_b). For example, the NOT gate 518 generates the signal 512 (e.g., PWM_b) which is complementary to the modulation signal 626 (e.g., PWM). As an example, if the modulation signal 626 is at the logic high level, the signal 512 is at the logic low level, and if the modulation signal 626 is at the logic low level, the signal 512 is at the logic high level.

In one embodiment, if the modulation signal 626 (e.g., PWM) is at the logic high level, the switch 502 is closed (e.g., being turned on) and the operational amplifier 506 receives the reference signal 636 (e.g., $V_{ref1}$) at its non-inverting terminal (e.g., terminal "+"), where the inverting terminal (e.g., terminal "−") and the output terminal of the amplifier 506 are connected. For example, the operational amplifier 506 includes a buffer amplifier with a gain of 1. As an example, the signal 512 is at the logic low level, and the switch 504 is open (e.g., being turned off). For example, the low pass filter 508 receives a signal 516 from the amplifier 506 and outputs a filtered signal 514 (e.g., $V_{duty}$). In another example, the filtered signal 514 (e.g., $V_{duty}$) is a voltage signal and is converted by the voltage-to-current converter 510 to the current 638 (e.g., $I_{ramp}$). In yet another example, the signal 516 is approximately equal (e.g., in magnitude) to the reference signal 636.

In another embodiment, if the modulation signal 626 (e.g., PWM) is at the logic low level and the signal 512 is at the logic high level, the switch 502 is open (e.g., being turned off), and the switch 504 is closed (e.g., being turned on). For example, the operational amplifier 506 receives a ground voltage 520 at its non-inverting terminal (e.g., terminal "+"), and changes the signal 516. As an example, the signal 516 is approximately equal to the ground voltage 520. As another example, the low pass filter 508 includes a RC filter which includes one or more resistors and one or more capacitors.

$$I_{ramp} = k_1 * D = \beta(V_{ref1}) * D \quad \text{(Equation 16)}$$

where $V_{ref1}$ represents the reference signal 636, and $\beta$ represents a coefficient parameter (e.g., a constant).

Figure 5D:
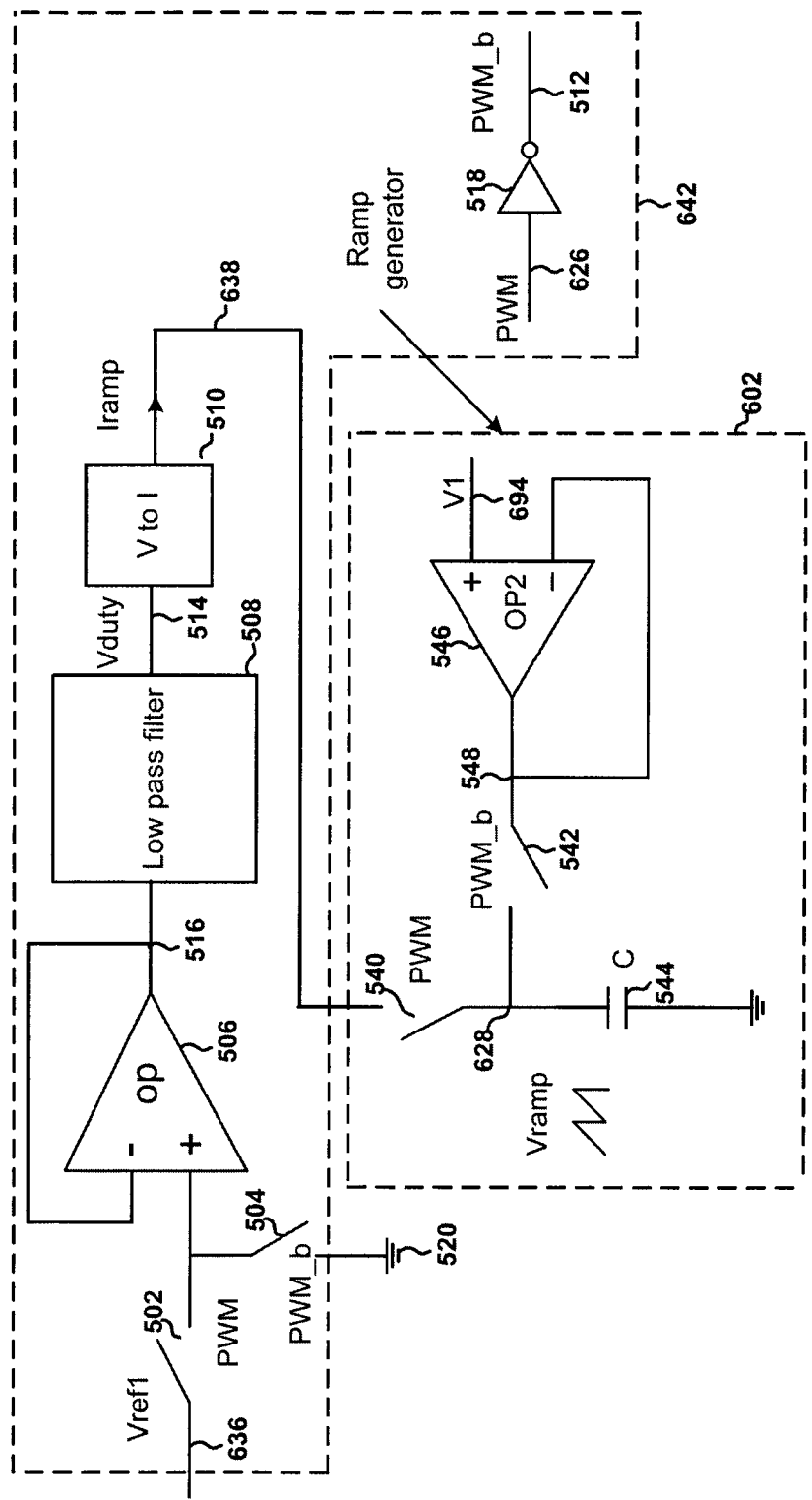
FIG. 5(d) is a simplified diagram showing a ramp-current generator and a ramp-signal generator as parts of the system controller as shown in FIG. 5(a) according to some embodiments of the present invention.

FIG. 5(d) is a simplified diagram showing the ramp-current generator 642 and the ramp-signal generator 602 as parts of the system controller 402 according to some embodiments of the present invention. This diagram is merely an example, which should not unduly limit the scope of the claims. One of ordinary skill in the art would recognize many variations, alternatives, and modifications. The ramp-signal generator 602 includes an operational amplifier 546, switches 540 and 542, and a capacitor 544. For example, the switches 502, 504, 540 and 532 each include one or more MOS transistors.

According to one embodiment, the switch 540 is closed or opened in response to the modulation signal 626 (e.g., PWM), and the switch 542 is closed or opened in response to the signal 512 (e.g., PWM_b). In one embodiment, if the modulation signal 626 (e.g., PWM) is at the logic low level and the signal 512 is at the logic high level, the switch 540 is open (e.g., being turned off) and the switch 504 is closed (e.g., being turned on). For example, the operational amplifier 546 receives the signal 694 (e.g., V1) at its non-inverting terminal (e.g., terminal "+") and outputs a signal 548, where the inverting terminal (e.g., terminal "−") and the output terminal of the amplifier 546 are connected together. As an example, the signal 548 is approximately equal (e.g., in magnitude) to the signal 694 (e.g., V1), and in response the voltage on the capacitor 544 becomes approximately equal (e.g., in magnitude) to the signal 548 and thus the signal 694 (e.g., V1).

In another embodiment, if the modulation signal 626 (e.g., PWM) changes to the logic high level and the signal 512 changes to the logic low level, the switch 540 is closed (e.g., being turned on) and the switch 504 is opened (e.g., being turned off). For example, the ramp-current generator 642 outputs the current 638 to charge the capacitor 544 through the closed switch 540. As an example, the ramping signal 628 which corresponds to the voltage on the capacitor 544 increases (e.g., linearly or non-linearly) from a magnitude approximately equal to the signal 694 (e.g., V1) to a maximum magnitude (e.g., the compensation signal 474) as the current 638 charges the capacitor 544.

As discussed above and further emphasized here, FIGS. 5(a), 5(b), 5(c), and 5(d) are merely examples, which should not unduly limit the scope of the claims. One of ordinary skill in the art would recognize many variations, alternatives, and modifications. For example, the ramp-current generator 642 generates the current 638 (e.g., $I_{ramp}$) based at least in part on a multiplication product of the duty cycle and a difference between the reference signal 636 and the compensation signal 474 (e.g., $V_{comp}$), so that the compensation signal 474 (e.g., $V_{comp}$) does not vary much at different input voltages to reduce the ripple effects of the compensation signal 474, e.g., as shown in FIG. 6(a).

Figure 6A:
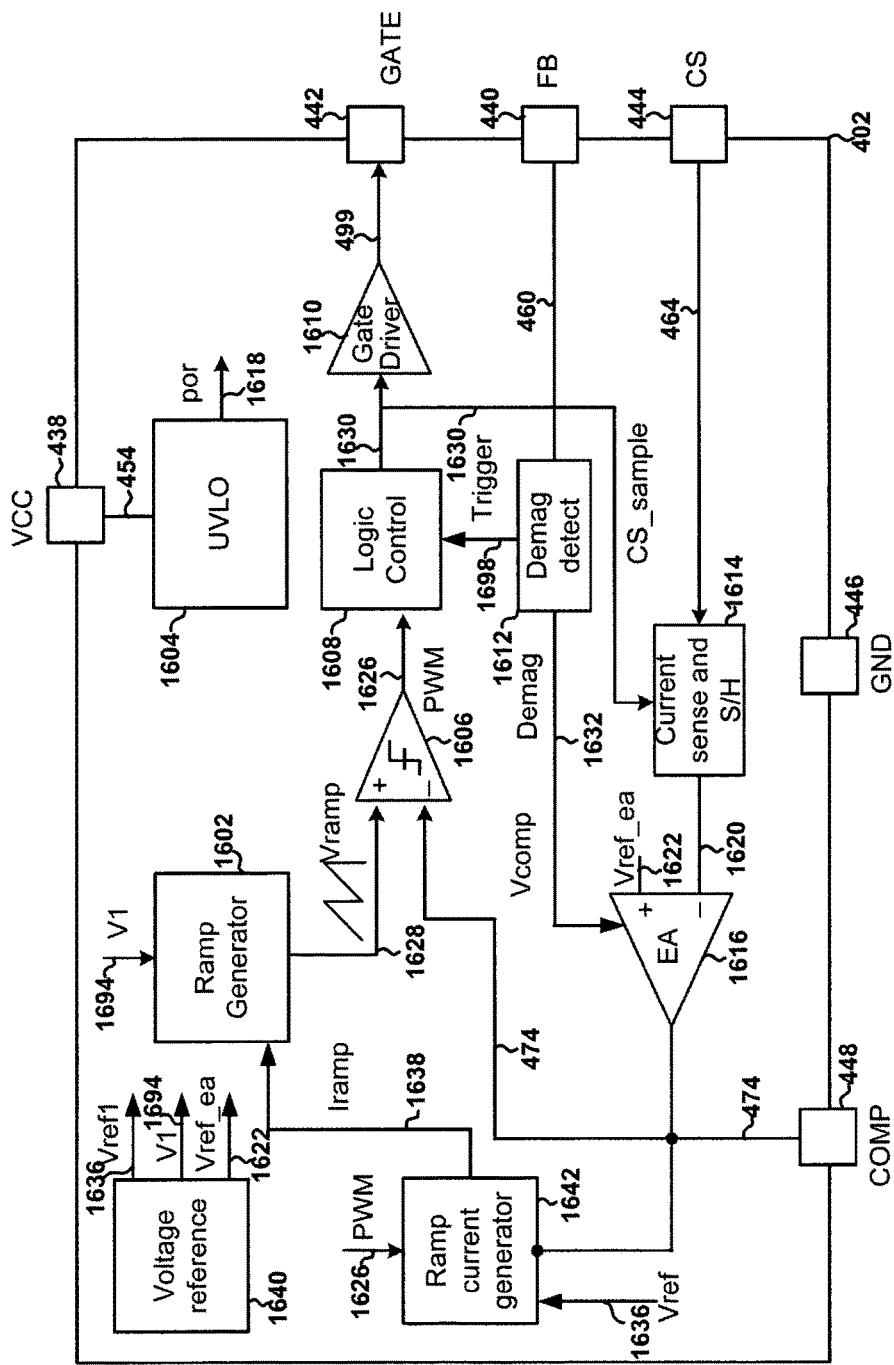
FIG. 6(a) is a simplified diagram showing a system controller as part of the power conversion system as shown in FIG. 4 according to another embodiment of the present invention.
Figure 6B:
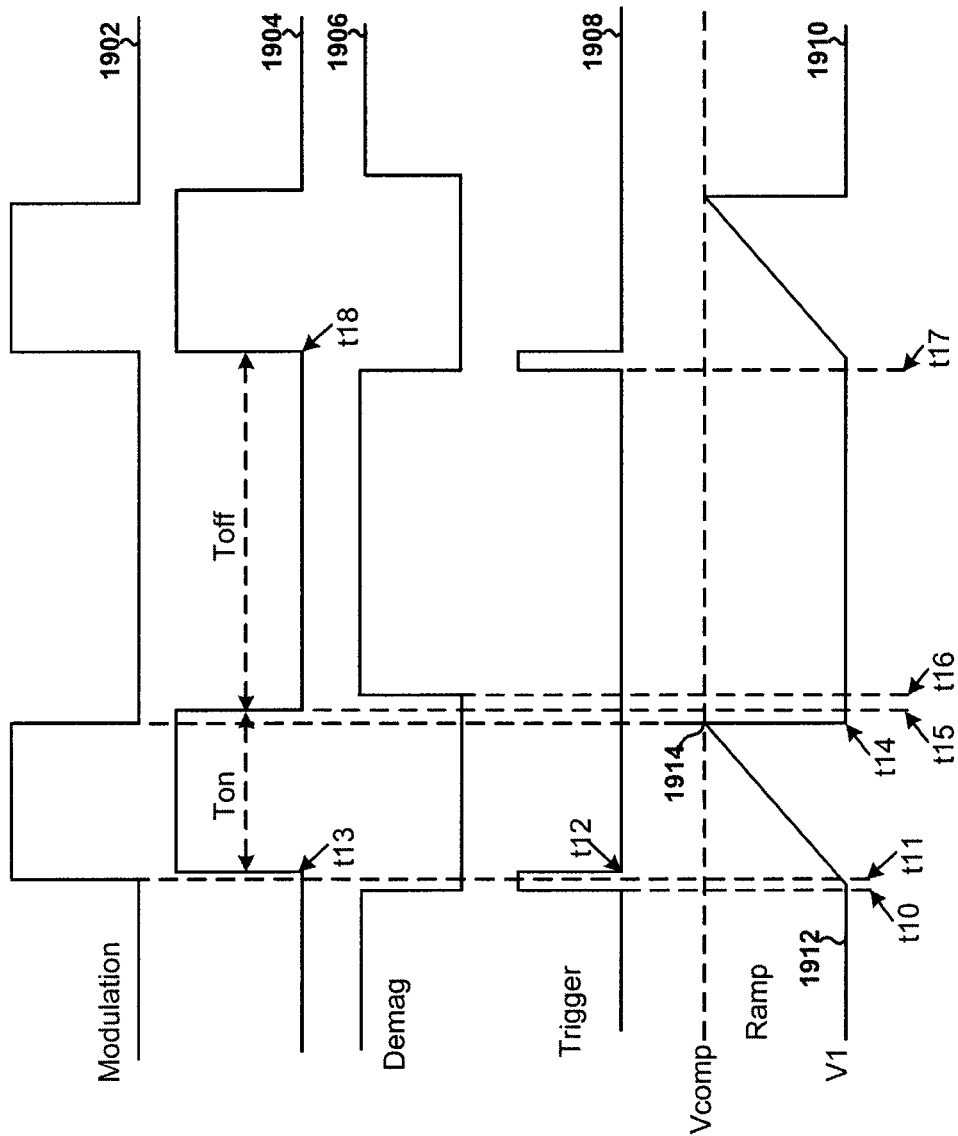
FIG. 6(b) is a simplified timing diagram for a system controller as part of the power conversion system as shown in FIG. 4 according to another embodiment of the present invention.
Figure 6C:
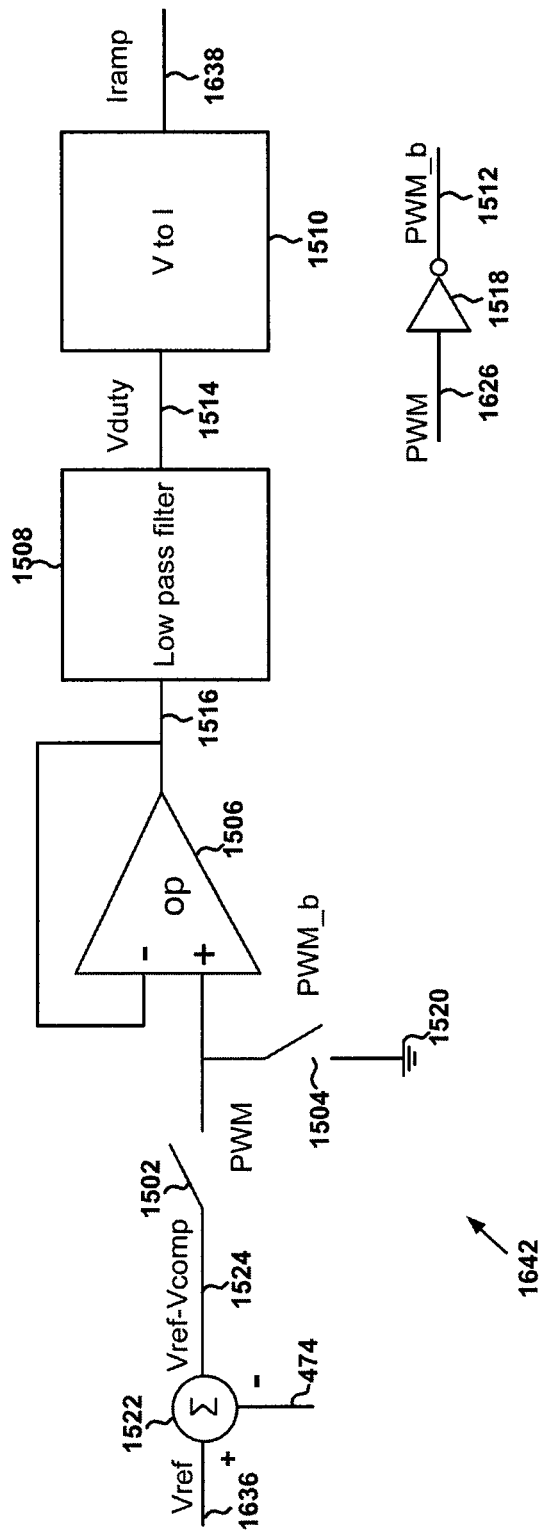
FIG. 6(c) is a simplified diagram showing a ramp-current generator as part of the system controller as shown in FIG. 6(a) according to another embodiment of the present invention.
Figure 6D:
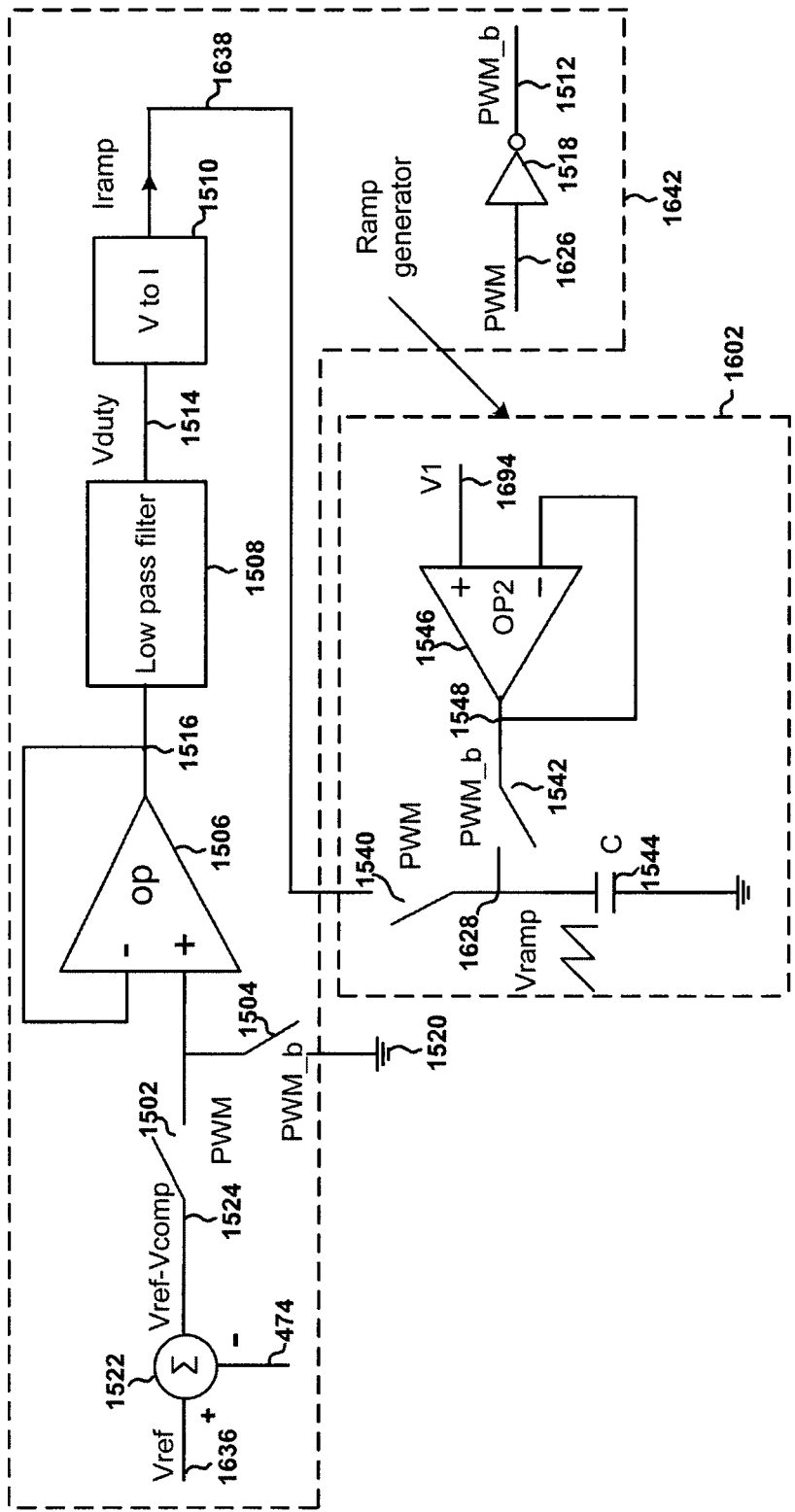
FIG. 6(d) is a simplified diagram showing a ramp-current generator and a ramp-signal generator as parts of the system controller as shown in FIG. 6(a) according to certain embodiments of the present invention.

FIG. 6(a) is a simplified diagram showing the system controller 402 as part of the power conversion system 400 according to another embodiment of the present invention. This diagram is merely an example, which should not unduly limit the scope of the claims. One of ordinary skill in the art would recognize many variations, alternatives, and modifications. The system controller 402 includes a ramp-signal generator 1602, an under-voltage lock-out (UVLO) component 1604, a modulation component 1606, a logic controller 1608, a driving component 1610, a demagnetization detector 1612, an error amplifier 1616, a current-sensing-and-sample/hold component 1614, a reference-voltage generator 1640, and a ramp-current generator 1642.

For example, the ramp-signal generator 1602, the under-voltage lock-out (UVLO) component 1604, the modulation component 1606, the logic controller 1608, the driving component 1610, the demagnetization detector 1612, the error amplifier 1616, the current-sensing-and-sample/hold component 1614, the reference-voltage generator 1640, and the ramp-current generator 1642 are the same as the ramp-signal generator 602, the under-voltage lock-out (UVLO) component 604, the modulation component 606, the logic controller 608, the driving component 610, the demagnetization detector 612, the error amplifier 616, the current-sensing-and-sample/hold component 614, the reference-voltage generator 640, and the ramp-current generator 642, respectively.

According to one embodiment, the UVLO component 1604 detects the signal 454 and outputs a signal 1618 (e.g., por). For example, if the signal 454 is larger than a first predetermined threshold in magnitude, the system controller 402 begins to operate normally. If the signal 454 is smaller than a second predetermined threshold in magnitude, the system controller 402 is turned off. In another example, the second predetermined threshold is smaller than or equal to the first predetermined threshold in magnitude. In yet another example, the error amplifier 1616 receives a signal 1620 from the current-sensing-and-sample/hold component 1614 and a reference signal 1622, and the compensation signal 474 (e.g., $V_{comp}$) is provided to the modulation component 1606 and the voltage-to-current-conversion component 1642. In yet another example, the capacitor 434 is coupled to the terminal 448 and forms, together with the error amplifier 1616, an integrator or a low-pass filter. In yet another example, the error amplifier 1616 is a transconductance amplifier and outputs a current which is proportional to a difference between the reference signal 1622 and the signal 1620. In yet another example, the error amplifier 1616 together with the capacitor 434 generates the compensation signal 474 (e.g., $V_{comp}$) which is a voltage signal.

As an example, the reference-voltage generator 1640 outputs a reference signal 1636 (e.g., $V_{ref}$) to the ramp-current generator 1642, outputs a voltage signal 1694 (e.g., V1) to the ramp-signal generator 1602, and outputs a reference signal 1622 (e.g., $V_{ref\_ea}$) to the error amplifier 1616. In another example, the ramp-signal generator 1602 also receives a current signal 1638 (e.g., $I_{ramp}$) generated by the ramp-current generator 1642 and generates a ramping signal 1628. In one embodiment, the current signal 1638 is equal in magnitude to the current signal 638. In another embodiment, the current signal 1638 is not equal in magnitude to the current signal 638.

According to another embodiment, the current 1638 (e.g., $I_{ramp}$) flows from the ramp-current generator 1642 to the ramp-signal generator 1602. For example, the current 1638 (e.g., $I_{ramp}$) flows from the ramp-signal generator 1602 to the ramp-current generator 1642. In another example, the modulation component 1606 receives the ramping signal 1628 and outputs a modulation signal 1626. In yet another example, the logic controller 1608 processes the modulation signal 1626 and outputs a control signal 1630 to the current-sensing-and-sample/hold component 1614 and the driving component 1610. In yet another example, the modulation signal 1626 corresponds to a pulse-width-modulation (PWM) signal.

According to yet another embodiment, the current-sensing-and-sample/hold component 1614 samples the current sensing signal 464 in response to the control signal 1630 and then holds the sampled signal until the current-sensing-and-sample/hold component 1614 samples again the current sensing signal 464. For example, the driving component 1610 generates the signal 499 related to the drive signal 456 to affect the switch 428. In another example, if the signal 499 is at the logic high level, the signal 456 is at the logic high level, and if the signal 499 is at the logic low level, the signal 456 is at the logic low level. As an example, the demagnetization detector 1612 detects the feedback signal 460 and outputs a demagnetization signal 1632 for determining the end of the demagnetization process of the secondary winding 414. As another example, the demagnetization detector 1612 detects the feedback signal 460 and outputs the demagnetization signal 1632 for determining the beginning and the end of the demagnetization process of the secondary winding 414. In yet another example, the demagnetization detector 1612 outputs a trigger signal 1698 to the logic controller 1608 to start a next cycle (e.g., corresponding to a next switching period).

To keep the multiplication product of the duty cycle (e.g., D) and the duration of the on-time period (e.g., $T_{on}$) constant, the ramp-current generator 1642 generates the current 1638 (e.g., $I_{ramp}$) to be proportional in magnitude to the duty cycle (e.g., D), according to some embodiments. For example, the current 1638 (e.g., $I_{ramp}$) is determined as follows:

$$I_{ramp} = k_2 * D \quad \text{(Equation 17)}$$

where $k_2$ represents a coefficient parameter. As an example, $k_2$ is proportional to a difference between the reference signal 1636 (e.g., $V_{ref}$) and the compensation signal 474 (e.g., $V_{comp}$). For example, a differential signal is generated based at least in part on the difference between the reference signal 1636 (e.g., $V_{ref}$) and the compensation signal 474 (e.g., $V_{comp}$). In certain embodiments, the current 1638 (e.g., $I_{ramp}$) is determined as follows:

$$I_{ramp} = \alpha(V_{ref} - V_{comp}) \times D \quad \text{(Equation 18)}$$

where α represents a coefficient parameter (e.g., a constant). In some applications, the compensation signal 474 (e.g., $V_{comp}$), e.g., the output of the error amplifier 1616, represents an output load condition for a given input voltage (e.g., $V_{bulk}$), according to certain embodiments.

In some embodiments, the ramp-current generator 1642 generates the current 1638 to be approximately proportional in magnitude to the duty cycle (e.g., D) so that the multiplication product of the duty cycle (e.g., D) and the duration of the on-time period (e.g., $T_{on}$) is kept approximately constant. For example, the current 1638 (e.g., $I_{ramp}$) is determined as follows:

$$I_{ramp} \cong k_2 * D \quad \text{(Equation 19)}$$

where $k_2$ represents a coefficient parameter. As an example, $k_2$ is approximately proportional to a difference between the reference signal 1636 (e.g., $V_{ref}$) and the compensation signal 474 (e.g., $V_{comp}$). For example, a differential signal is generated based at least in part on the difference between the reference signal 1636 (e.g., $V_{ref}$) and the compensation signal 474 (e.g., $V_{comp}$). In certain embodiments, the current 1638 (e.g., $I_{ramp}$) is determined as follows:

$$I_{ramp} \cong \alpha(V_{ref} - V_{comp}) \times D \quad \text{(Equation 20)}$$

where α represents a coefficient parameter (e.g., a constant). For example, as shown in Equation 20, the error range of the current 1638 being proportional in magnitude to a multiplication product of the duty cycle and the difference between the reference signal 1636 and the compensation signal 474 is ±5%. In another example, as shown in Equation 20, the error range of the current 1638 being proportional in magnitude to a multiplication product of the duty cycle and the difference between the reference signal 1636 and the compensation signal 474 is ±10%. In yet another example, as shown in Equation 20, the error range of the current 1638 being proportional in magnitude to a multiplication product of the duty cycle and the difference between the reference signal 1636 and the compensation signal 474 is ±15%. In yet another example, as shown in Equation 20, the error range of the current 1638 being proportional in magnitude to a multiplication product of the duty cycle and the difference between the reference signal 1636 and the compensation signal 474 is ±20%.

As discussed above and further emphasized here, FIG. 6(a) is merely an example, which should not unduly limit the scope of the claims. One of ordinary skill in the art would recognize many variations, alternatives, and modifications. For example, instead of receiving the modulation signal 1626, the ramp-current generator 1642 receives the signal 499 associated with the drive signal 456. In another example, instead of receiving the modulation signal 1626, the ramp-current generator 1642 receives the demagnetization signal 1632. In yet another example, instead of receiving the modulation signal 1626, the ramp-current generator 1642 receives a signal complementary to the demagnetization signal 1632.

FIG. 6(*b*) is a simplified timing diagram for the system controller 402 as part of the power conversion system 400 according to another embodiment of the present invention. This diagram is merely an example, which should not unduly limit the scope of the claims. One of ordinary skill in the art would recognize many variations, alternatives, and modifications. The waveform 1902 represents the modulation signal 1626 as a function of time, the waveform 1904 represents the signal 499 as a function of time, the waveform 1906 represents the demagnetization signal 1632 as a function of time, the waveform 1908 represents the trigger signal 1698 as a function of time, and the waveform 1910 represents the ramping signal 1628 as a function of time.

An on-time period and an off-time period associated with the signal 499 are shown in FIG. 6(*b*). The on-time period begins at a time $t_{13}$ and ends at a time $t_{15}$, and the off-time period begins at the time $t_{15}$ and ends at a time $t_{18}$. For example, $t_{10} \leq t_{11} \leq t_{12} \leq t_{13} \leq t_{14} \leq t_{15} \leq t_{16} \leq t_{17} \leq t_{18}$.

According to one embodiment, at $t_{10}$, the demagnetization signal 1632 changes from the logic high level to the logic low level. For example, the demagnetization detector 1612 generates a pulse (e.g., between $t_{10}$ and $t_{12}$) in the trigger signal 1698 to trigger a new cycle. As an example, the ramping signal 1628 begins to increase from a magnitude 1912 to a magnitude 1914 (e.g., at $t_{14}$). In another example, at $t_{11}$, the signal 1626 changes from the logic low level to the logic high level. After a short delay, the signal 499 changes (e.g., at $t_{13}$) from the logic low level to the logic high level, and in response the switch 428 is closed (e.g., being turned on). In yet another example, at $t_{14}$, the signal 1626 changes from the logic high level to the logic low level, and the ramping signal 1628 decreases from the magnitude 1914 to the magnitude 1912. After a short delay, the signal 499 changes (e.g., at $t_{15}$) from the logic high level to the logic low level, and in response, the switch 428 is open (e.g., being turned off). As an example, at $t_{16}$, the demagnetization signal 1632 changes from the logic low level to the logic high level which indicates a beginning of a demagnetization process. In another example, at $t_{17}$, the demagnetization signal 1632 changes from the logic high level to the logic low level which indicates the end of the demagnetization process. In yet another example, the demagnetization detector 1612 generates another pulse in the trigger signal 1698 to start a next cycle. In yet another example, the magnitude 1912 of the ramping signal 1628 is associated with the signal 1694. In yet another example, the magnitude 1914 of the ramping signal 1628 is associated with the magnitude of the compensation signal 474. In yet another example, a ramping slope of the ramp signal 1628 is modulated by the compensation signal 474 (e.g., $V_{comp}$), e.g., the output of the error amplifier 1616.

According to another embodiment, the magnitude change of the ramping signal 1628 during the on-time period is determined as follows:

$$\Delta V_{ramp} = V_{comp} - V1 = slp \times T_{on} \qquad \text{(Equation 21)}$$

where $\Delta V_{ramp}$ represents the magnitude changes of the ramping signal 1628, $V_{comp}$ represents the signal 474, V1 represents the signal 1694, slp represents a ramping slope associated with the ramping signal 1628, and $T_{on}$ represents the duration of the on-time period. For example, V1 corresponds to the magnitude 1912 of the ramping signal 1628. Based on Equation 15, the duration of the on-time period is determined as follows:

$$T_{on} = \frac{V_{comp} - V1}{slp} \qquad \text{(Equation 22)}$$

As shown in Equation 22, for a given compensation signal (e.g., the output of the error amplifier 1616), the duration of the on-time period is determined by the ramping slope of the ramping signal 1628, according to certain embodiments. For example, a slope of the waveform 1910 between $t_{11}$ and $t_{14}$ corresponds to the ramping slope of the ramping signal 1628. In some embodiments, the ramping slope of the ramping signal 1628 is the same as the ramping slope of the ramping signal 628. In certain embodiments, the ramping slope of the ramping signal 1628 is different from the ramping slope of the ramping signal 628.

FIG. 6(*c*) is a simplified diagram showing the ramp-current generator 1642 as part of the system controller 402 according to another embodiment of the present invention. This diagram is merely an example, which should not unduly limit the scope of the claims. One of ordinary skill in the art would recognize many variations, alternatives, and modifications. The ramp-current generator 1642 includes an operational amplifier 1506, a low pass filter 1508, a voltage-to-current converter 1510, a NOT gate 1518, a summation component 1522, and switches 1502 and 1504. For example, the operational amplifier 1506, the low pass filter 1508, the voltage-to-current converter 1510, the NOT gate 1518, and the switches 1502 and 1504 are the same as the operational amplifier 506, the low pass filter 508, the voltage-to-current converter 510, the NOT gate 518, and the switches 502 and 504, respectively.

According to one embodiment, the switch 1502 is closed or opened in response to the modulation signal 1626 (e.g., PWM), and the switch 1504 is closed or opened in response to a signal 1512 (e.g., PWM_b). For example, the NOT gate 1518 generates the signal 1512 (e.g., PWM_b) which is complementary to the modulation signal 1626 (e.g., PWM). As an example, if the modulation signal 1626 is at the logic high level, the signal 1512 is at the logic low level, and if the modulation signal 1626 is at the logic low level, the signal 1512 is at the logic high level. In another example, the summation component 1522 receives the reference signal 1636 (e.g., $V_{ref}$) and the compensation signal 474 (e.g., $V_{comp}$) and generates a signal 1524, where the signal 1524 is equal (e.g., in magnitude) to a difference between the reference signal 1636 (e.g., $V_{ref}$) and the compensation signal 474 (e.g., $V_{comp}$).

In one embodiment, if the modulation signal 1626 (e.g., PWM) is at the logic high level, the switch 1502 is closed (e.g., being turned on) and the operational amplifier 1506 receives the signal 1524 at its non-inverting terminal (e.g., terminal "+"), where the inverting terminal (e.g., terminal "−") and the output terminal of the amplifier 1506 are connected together. As an example, the signal 1512 is at the logic low level, and the switch 1504 is open (e.g., being turned off). For example, the low pass filter 1508 receives a signal 1516 from the amplifier 1506 and outputs a filtered signal 1514 (e.g., $V_{duty}$). In another example, the filtered signal 1514 (e.g., $V_{duty}$) is a voltage signal and is converted by the voltage-to-current converter 1510 to the current 1638 (e.g., $I_{ramp}$). In yet another example, the signal 1516 is approximately equal (e.g., in magnitude) to the signal 1524.

In another embodiment, if the modulation signal 1626 (e.g., PWM) is at the logic low level and the signal 1512 is at the logic high level, the switch 1502 is open (e.g., being turned off), and the switch 1504 is closed (e.g., being turned on). For example, the operational amplifier 1506 receives a ground voltage 1520 at its non-inverting terminal (e.g., terminal "+"), and changes the signal 1516. As an example, the signal 1516 is approximately equal to the ground voltage 1520. As another example, the low pass filter 1508 includes a RC filter which includes one or more resistors and one or more capacitors.

FIG. 6(*d*) is a simplified diagram showing the ramp-current generator 1642 and the ramp-signal generator 1602 as parts of the system controller 402 according to certain embodiments of the present invention. This diagram is merely an example, which should not unduly limit the scope of the claims. One of ordinary skill in the art would recognize many variations, alternatives, and modifications. The ramp-signal generator 1602 includes an operational amplifier 1546, switches 1540 and 1542, and a capacitor 1544. For example, the switches 1502, 1504, 1540 and 1542 each include one or more MOS transistors.

According to one embodiment, the switch 1540 is closed or opened in response to the modulation signal 1626 (e.g., PWM), and the switch 1542 is closed or opened in response to the signal 1512 (e.g., PWM_b). In one embodiment, if the modulation signal 1626 (e.g., PWM) is at the logic low level and the signal 1512 is at the logic high level, the switch 1540 is open (e.g., being turned off) and the switch 1504 is closed (e.g., being turned on). For example, the operational amplifier 1546 receives the signal 1694 (e.g., V1) at its non-inverting terminal (e.g., terminal "+") and outputs a signal 1548, where the inverting terminal (e.g., terminal "−") and the output terminal of the amplifier 1546 are connected together. In another example, the operational amplifier 1546 includes a buffer amplifier with a gain of 1. As an example, the signal 1548 is approximately equal (e.g., in magnitude) to the signal 1694 (e.g., V1), and in response the voltage on the capacitor 1544 becomes approximately equal (e.g., in magnitude) to the signal 1548 and thus the signal 1694 (e.g., V1).

In another embodiment, if the modulation signal 1626 (e.g., PWM) changes to the logic high level and the signal 1512 changes to the logic low level, the switch 1540 is closed (e.g., being turned on) and the switch 1504 is opened (e.g., being turned off). For example, the ramp-current generator 1642 outputs the current 1638 to charge the capacitor 1544 through the closed switch 1540. As an example, the ramping signal 1628 which corresponds to the voltage on the capacitor 1544 increases (e.g., linearly or non-linearly) from a magnitude approximately equal to the signal 1694 (e.g., V1) to a maximum magnitude (e.g., the compensation signal 474) as the current 1638 charges the capacitor 1544.

According to one embodiment, a system controller for regulating a power conversion system includes: a first controller terminal configured to receive a first signal related to an input signal for a primary winding of a power conversation system; and a second controller terminal configured to output a drive signal to a switch to affect a current flowing through the primary winding of the power conversion system, the drive signal being associated with a switching period including an on-time period and an off-time period. The switch is closed in response to the drive signal during the on-time period. The switch is opened in response to the drive signal during the off-time period. A duty cycle is equal to a duration of the on-time period divided by a duration of the switching period. The system controller is configured to keep a multiplication product of the duty cycle and the duration of the on-time period approximately constant. For example, the system controller is implemented according to at least FIG. 4, FIG. 5(*a*), FIG. 5(*b*), FIG. 5(*c*), and/or FIG. 5(*d*).

According to another embodiment, a system controller for regulating a power conversion system includes: a ramp-current generator configured to receive a modulation signal and generate a ramp current based at least in part on the modulation signal; a ramp-signal generator configured to receive the ramp current and generate a ramping signal based at least in part on the ramp current; a modulation component configured to receive the ramping signal and generate the modulation signal based at least in part on the ramping signal; a driving component configured to receive the modulation signal and output a drive signal to a switch to affect a current flowing through a primary winding of a power conversion system, the drive signal being associated with a switching period including an on-time period and an off-time period. The switch is closed in response to the drive signal during the on-time period. The switch is opened in response to the drive signal during the off-time period. A duty cycle is equal to a duration of the on-time period divided by a duration of the switching period. The ramp-current generator is further configured to generate the ramp current approximately proportional to the duty cycle in magnitude. For example, the system controller is implemented according to at least FIG. 4, FIG. 5(*a*), FIG. 5(*b*), FIG. 5(*c*), and/or FIG. 5(*d*).

According to yet another embodiment, a system controller for regulating a power conversion system includes: a first controller terminal configured to provide a compensation signal based on at least information associated with a current flowing through a primary winding of a power conversion system; a ramp-current generator configured to receive a modulation signal, the compensation signal and a first reference signal and generate a ramp current based at least in part on the modulation signal, the compensation signal and the first reference signal; a ramp-signal generator configured to receive the ramp current and generate a ramping signal based at least in part on the ramp current; a modulation component configured to receive the ramping signal and the compensation signal and generate the modulation signal based at least in part on the ramping signal and the compensation signal; and a driving component configured to receive the modulation signal and output a drive signal to a switch to affect the current, the drive signal being associated with a switching period including an on-time period and an off-time period. The switch is closed in response to the drive signal during the on-time period. The switch is opened in response to the drive signal during the off-time period. A duty cycle is equal to a duration of the on-time period divided by a duration of the switching period. The ramp-current generator is further configured to generate the ramp current approximately proportional in magnitude to a multiplication product of the duty cycle and a difference, the different representing the first reference signal minus the compensation signal in magnitude. For example, the system controller is implemented according to at least FIG. 4, FIG. 6(*a*), FIG. 6(*b*), FIG. 6(*c*), and/or FIG. 6(*d*).

In one embodiment, a method for regulating a power conversion system includes: generating a drive signal associated with a switching period including an on-time period and an off-time period; and outputting the drive signal to a switch to affect a current flowing through a primary winding of a power conversion system. The outputting the drive signal to the switch to affect the current includes: outputting the drive signal to close the switch during the on-time period; and outputting the drive signal to open the switch during the off-time period. A duty cycle is equal to a duration of the on-time period divided by a duration of the switching period. The generating the drive signal associated with the switching period includes keeping a multiplication product of the duty cycle and the duration of the on-time period approximately constant. For example, the method is implemented according to at least FIG. 4, FIG. 5(a), FIG. 5(b), FIG. 5(c), and/or FIG. 5(d).

In another embodiment, a method for regulating a power conversion system includes: receiving a modulation signal; generating a ramp current based at least in part on the modulation signal; receiving the ramp current; generating a ramping signal based at least in part on the ramp current; receiving the ramping signal; generating the modulation signal based at least in part on the ramping signal; receiving the modulation signal; generating a drive signal based at least in part on the modulation signal, the drive signal being associated with a switching period including an on-time period and an off-time period; and outputting the drive signal to a switch to affect a current flowing through a primary winding of a power conversion system. The outputting the drive signal to the switch to affect the current includes: outputting the drive signal to close the switch during the on-time period; and outputting the drive signal to open the switch during the off-time period. A duty cycle is equal to a duration of the on-time period divided by a duration of the switching period. The generating the ramp current based at least in part on the modulation signal includes generating the ramp current approximately proportional to the duty cycle in magnitude. For example, the method is implemented according to at least FIG. 4, FIG. 5(a), FIG. 5(b), FIG. 5(c), and/or FIG. 5(d).

In yet another embodiment, a method for regulating a power conversion system includes: providing a compensation signal based on at least information associated with a current flowing through a primary winding of a power conversion system; receiving a modulation signal, the compensation signal and a first reference signal; generating a ramp current based at least in part on the modulation signal, the compensation signal and the first reference signal; receiving the ramp current; generating a ramping signal based at least in part on the ramp current; receiving the ramping signal and the compensation signal; generating the modulation signal based at least in part on the ramping signal and the compensation signal; receiving the modulation signal; and outputting a drive signal to a switch to affect the current, the drive signal being associated with a switching period including an on-time period and an off-time period. The outputting the drive signal to the switch to affect the current includes: outputting the drive signal to close the switch during the on-time period; outputting the drive signal to open the switch during the off-time period. A duty cycle is equal to a duration of the on-time period divided by a duration of the switching period. The generating the ramp current based at least in part on the modulation signal, the compensation signal and the first reference signal includes generating the ramp current approximately proportional in magnitude to a multiplication product of the duty cycle and a difference, the different representing the first reference signal minus the compensation signal in magnitude. For example, the method is implemented according to at least FIG. 4, FIG. 6(a), FIG. 6(b), FIG. 6(c), and/or FIG. 6(d).

For example, some or all components of various embodiments of the present invention each are, individually and/or in combination with at least another component, implemented using one or more software components, one or more hardware components, and/or one or more combinations of software and hardware components. In another exampl, individually and/or in combination with at least another component, implemene, some or all components of various embodiments of the present invention each areted in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power conversion system, the system controller comprising:
   a first controller terminal configured to receive a first signal related to an input signal for a primary winding of a power conversation system; and
   a second controller terminal configured to output a drive signal to a switch to affect a first current flowing through the primary winding of the power conversion system, the drive signal being associated with a switching period including an on-time period and an off-time period;
   wherein:
   the switch is closed in response to the drive signal during the on-time period;
   the switch is opened in response to the drive signal during the off-time period; and
   a duty cycle is equal to a duration of the on-time period divided by a duration of the switching period;
   wherein: the system controller is configured to keep a multiplication product of the duty cycle and the duration of the on-time period approximately constant; and the system controller is further configured to keep the multiplication product of the duty cycle and the duration of the on-time period approximately constant so that an average of the first current during one or more switching periods increases in magnitude with the increasing input signal over time and decreases in magnitude with the decreasing input signal over time.

2. The system controller of claim 1 wherein the system controller is further configured to keep the multiplication product of the duty cycle and the duration of the on-time period constant.

3. The system controller of claim 1, further comprising:
   a ramp-current generator configured to receive a modulation signal and generate a ramp current based at least in part on the modulation signal;
   a ramp-signal generator configured to receive the ramp current and generate a ramping signal based at least in part on the ramp current;
   a modulation component configured to receive the ramping signal and generate the modulation signal based at least in part on the ramping signal; and a driving component configured to receive the modulation signal and output the drive signal.

4. The system controller of claim 3 wherein the ramp-current generator includes:
an amplifier configured to generate an amplified signal based at least in part on the modulation signal;
a low-pass filter configured to receive the amplified signal and generate a filtered signal based at least in part on the amplified signal; and
a voltage-to-current converter configured to receive the filtered signal and generate the ramp current based at least in part on the filtered signal.

5. The system controller of claim 4 wherein the amplifier is further configured to:
in response to the modulation signal being at a first logic level, receive a reference signal and generate the amplified signal based at least in part on the reference signal; and
in response to the modulation signal being at a second logic level, receive a ground voltage and generate the amplified signal based at least in part on the ground voltage.

6. The system controller of claim 5 wherein the ramp-current generator further includes:
a first switch coupled to the amplifier and configured to be closed to pass the reference signal in response to the modulation signal being at the first logic level; and
a second switch coupled to the amplifier and configured to be closed to pass the ground voltage in response to the modulation signal being at the second logic level.

7. The system controller of claim 3, further comprising:
a demagnetization detector configured to receive a feedback signal associated with an output signal of the power conversion system and generate a trigger signal based at least in part on the feedback signal, the trigger signal indicating an end of a demagnetization process of the power conversion system; and
a logic controller configured to receive the trigger signal and generate a second signal based at least in part on the trigger signal to affect the drive signal.

8. The system controller of claim 7, further comprising:
an error amplifier configured to receive a reference signal and generate a third signal based at least in part on the reference signal.

9. The system controller of claim 8 wherein:
the error amplifier is further configured to generate the third signal to charge or discharge a capacitor to generate a compensation signal; and
the modulation component is further configured to receive the compensation signal and generate the modulation signal based at least in part on the compensation signal and the ramping signal.

10. The system controller of claim 3 wherein the ramping signal increases in magnitude at a ramping slope during the on-time period.

11. A system controller for regulating a power conversion system, the system controller comprising:
a ramp-current generator configured to receive a modulation signal and generate a ramp current based at least in part on the modulation signal;
a ramp-signal generator configured to receive the ramp current and generate a ramping signal based at least in part on the ramp current;
a modulation component configured to receive the ramping signal and generate the modulation signal based at least in part on the ramping signal; and
a driving component configured to receive the modulation signal and output a drive signal to a switch to affect a current flowing through a primary winding of a power conversion system, the drive signal being associated with a switching period including an on-time period and an off-time period;
wherein:
the switch is closed in response to the drive signal during the on-time period;
the switch is opened in response to the drive signal during the off-time period; and
a duty cycle is equal to a duration of the on-time period divided by a duration of the switching period;
wherein the ramp-current generator is further configured to generate the ramp current approximately proportional to the duty cycle in magnitude.

12. The system controller of claim 11 is configured to keep a multiplication product of the duty cycle and the duration of the on-time period approximately constant in response to the ramp current being approximately proportional to the duty cycle in magnitude.

13. The system controller of claim 11 wherein the ramp-current generator is further configured to generate the ramp current proportional to the duty cycle in magnitude.

14. The system controller of claim 13 is configured to keep a multiplication product of the duty cycle and the duration of the on-time period constant in response to the ramp current being proportional to the duty cycle in magnitude.

15. The system controller of claim 11 wherein the ramp-current generator includes:
an amplifier configured to generate an amplified signal based at least in part on the modulation signal;
a low-pass filter configured to receive the amplified signal and generate a filtered signal based at least in part on the amplified signal; and
a voltage-to-current converter configured to receive the filtered signal and generate the ramp current based at least in part on the filtered signal.

16. The system controller of claim 15 wherein the amplifier is further configured to:
in response to the modulation signal being at a first logic level, receive a reference signal and generate the amplified signal based at least in part on the reference signal; and
in response to the modulation signal being at a second logic level, receive a ground voltage and generate the amplified signal based at least in part on the ground voltage.

17. The system controller of claim 16 wherein the ramp-current generator further includes:
a first switch coupled to the amplifier and configured to be closed to pass the reference signal in response to the modulation signal being at the first logic level; and
a second switch coupled to the amplifier and configured to be closed to pass the ground voltage in response to the modulation signal being at the second logic level.

18. The system controller of claim 11, further comprising:
a demagnetization detector configured to receive a feedback signal associated with an output signal of the power conversion system and generate a trigger signal based at least in part on the feedback signal, the trigger signal indicating an end of a demagnetization process of the power conversion system; and
a logic controller configured to receive the trigger signal and generate a second signal based at least in part on the trigger signal to affect the drive signal.

19. The system controller of claim 18, further comprising:
an error amplifier configured to receive a reference signal and generate a third signal based at least in part on the reference signal.

20. The system controller of claim 19 wherein:
the error amplifier is further configured to generate the third signal to charge a capacitor to generate a compensation signal; and
the modulation component is further configured to receive the compensation signal and generate the modulation signal based at least in part on the compensation signal and the ramping signal.

21. The system controller of claim 11 wherein the ramping signal increases in magnitude at a ramping slope during the on-time period.

22. A system controller for regulating a power conversion system, the system controller comprising:
a first controller terminal configured to provide a compensation signal based on at least information associated with a first current flowing through a primary winding of a power conversion system;
a ramp-current generator configured to receive a modulation signal, the compensation signal and a first reference signal and generate a ramp current based at least in part on the modulation signal, the compensation signal and the first reference signal;
a ramp-signal generator configured to receive the ramp current and generate a ramping signal based at least in part on the ramp current;
a modulation component configured to receive the ramping signal and the compensation signal and generate the modulation signal based at least in part on the ramping signal and the compensation signal; and
a driving component configured to receive the modulation signal and output a drive signal to a switch to affect the first current, the drive signal being associated with a switching period including an on-time period and an off-time period;
wherein:
the switch is closed in response to the drive signal during the on-time period;
the switch is opened in response to the drive signal during the off-time period; and
a duty cycle is equal to a duration of the on-time period divided by a duration of the switching period;
wherein the ramp-current generator is further configured to generate the ramp current approximately proportional in magnitude to a multiplication product of the duty cycle and a difference, the difference representing the first reference signal minus the compensation signal in magnitude.

23. The system controller of claim 22 is configured to keep a multiplication product of the duty cycle and the duration of the on-time period approximately constant in response to the ramp current being approximately proportional in magnitude to the multiplication product of the duty cycle and the difference.

24. The system controller of claim 22 wherein the ramp-current generator is further configured to generate the ramp current proportional in magnitude to the multiplication product of the duty cycle and the difference.

25. The system controller of claim 24 is configured to keep a multiplication product of the duty cycle and the duration of the on-time period constant in response to the ramp current being proportional in magnitude to the multiplication product of the duty cycle and the difference.

26. The system controller of claim 22 wherein the ramp-current generator includes:
an amplifier configured to generate an amplified signal based at least in part on the modulation signal;
a low-pass filter configured to receive the amplified signal and generate a filtered signal based at least in part on the amplified signal; and
a voltage-to-current converter configured to receive the filtered signal and generate the ramp current based at least in part on the filtered signal.

27. The system controller of claim 26 wherein the amplifier is further configured to:
in response to the modulation signal being at a first logic level, receive a differential signal indicating a difference between the first reference signal and the compensation signal and generate the amplified signal based at least in part on the differential signal; and
in response to the modulation signal being at a second logic level, receive a ground voltage and generate the amplified signal based at least in part on the ground voltage.

28. The system controller of claim 27 wherein the ramp-current generator further includes:
a first switch coupled to the amplifier and configured to be closed to pass the differential signal in response to the modulation signal being at the first logic level; and
a second switch coupled to the amplifier and configured to be closed to pass the ground voltage in response to the modulation signal being at the second logic level.

29. The system controller of claim 27, further comprising an error amplifier configured to receive a second reference signal and generate a second signal based at least in part on the second reference signal to charge a capacitor to generate the compensation signal.

30. The system controller of claim 22, further comprising:
a demagnetization detector configured to receive a feedback signal associated with an output signal of the power conversion system and generate a trigger signal based at least in part on the feedback signal, the trigger signal indicating an end of a demagnetization process of the power conversion system; and
a logic controller configured to receive the trigger signal and generate a second signal based at least in part on the trigger signal to affect the drive signal.

31. The system controller of claim 22 wherein the ramping signal increases in magnitude at a ramping slope during the on-time period.

32. A method for regulating a power conversion system, the method comprising:
receiving a first signal related to an input signal for a primary winding of a power conversion system;
generating a drive signal associated with a switching period including an on-time period and an off-time period; and
outputting the drive signal to a switch to affect a current flowing through the primary winding of the power conversion system;
wherein the outputting the drive signal to the switch to affect the current includes:
outputting the drive signal to close the switch during the on-time period; and
outputting the drive signal to open the switch during the off-time period;
wherein a duty cycle is equal to a duration of the on-time period divided by a duration of the switching period;

wherein the generating the drive signal associated with the switching period includes keeping a multiplication product of the duty cycle and the duration of the on-time period approximately constant so that an average of the current during one or more switching periods increases in magnitude with the increasing input signal over time and decreases in magnitude with the decreasing input signal over time.

33. The method of claim 32 wherein the keeping the multiplication product of the duty cycle and the duration of the on-time period approximately constant includes keeping the multiplication product of the duty cycle and the duration of the on-time period constant.

34. A method for regulating a power conversion system, the method comprising:
  receiving a modulation signal;
  generating a ramp current based at least in part on the modulation signal;
  receiving the ramp current;
  generating a ramping signal based at least in part on the ramp current;
  receiving the ramping signal;
  generating the modulation signal based at least in part on the ramping signal;
  receiving the modulation signal;
  generating a drive signal based at least in part on the modulation signal, the drive signal being associated with a switching period including an on-time period and an off-time period; and
  outputting the drive signal to a switch to affect a first current flowing through a primary winding of a power conversion system;
  wherein the outputting the drive signal to the switch to affect the first current includes:
    outputting the drive signal to close the switch during the on-time period; and
    outputting the drive signal to open the switch during the off-time period;
    wherein a duty cycle is equal to a duration of the on-time period divided by a duration of the switching period;
  wherein the generating the ramp current based at least in part on the modulation signal includes generating the ramp current approximately proportional to the duty cycle in magnitude.

35. The method of claim 34 wherein the generating the ramp current approximately proportional to the duty cycle in magnitude includes generating the ramp current proportional to the duty cycle in magnitude.

36. A method for regulating a power conversion system, the method comprising:
  providing a compensation signal based on at least information associated with a first current flowing through a primary winding of a power conversion system;
  receiving a modulation signal, the compensation signal and a reference signal;
  generating a ramp current based at least in part on the modulation signal, the compensation signal and the reference signal;
  receiving the ramp current;
  generating a ramping signal based at least in part on the ramp current;
  receiving the ramping signal and the compensation signal;
  generating the modulation signal based at least in part on the ramping signal and the compensation signal;
  receiving the modulation signal; and
  outputting a drive signal to a switch to affect the first current, the drive signal being associated with a switching period including an on-time period and an off-time period;
  wherein the outputting the drive signal to the switch to affect the first current includes:
    outputting the drive signal to close the switch during the on-time period; and
    outputting the drive signal to open the switch during the off-time period;
    wherein a duty cycle is equal to a duration of the on-time period divided by a duration of the switching period;
  wherein the generating the ramp current based at least in part on the modulation signal, the compensation signal and the reference signal includes generating the ramp current approximately proportional in magnitude to a multiplication product of the duty cycle and a difference, the difference representing the reference signal minus the compensation signal in magnitude.

37. The method of claim 36 wherein the generating the ramp current approximately proportional in magnitude to the multiplication product of the duty cycle and the difference includes generating the ramp current proportional in magnitude to the multiplication product of the duty cycle and the difference.

* * * * *